(12) United States Patent
Ito et al.

(10) Patent No.: US 10,782,924 B2
(45) Date of Patent: Sep. 22, 2020

(54) CONTROLLER, PRINTER AND NON-TRANSITORY COMPUTER-READABLE MEDIUM STORING COMPUTER PROGRAM REDUCING THE TIME FOR IDENTIFYING A BLANK LINE IN IMAGE DATA

(71) Applicant: Brother Kogyo Kabushiki Kaisha, Nagoya-shi, Aichi-ken (JP)

(72) Inventors: Tsuyoshi Ito, Nagoya (JP); Satoru Arakane, Nagoya (JP); Yasuo Ono, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 16/671,658

(22) Filed: Nov. 1, 2019

(65) Prior Publication Data

US 2020/0145555 A1    May 7, 2020

(30) Foreign Application Priority Data

Nov. 2, 2018  (JP) ................................. 2018-207261

(51) Int. Cl.
*G06F 3/12*    (2006.01)
*H04N 1/00*    (2006.01)
*H04N 1/23*    (2006.01)

(52) U.S. Cl.
CPC .......... *G06F 3/1215* (2013.01); *G06F 3/1242* (2013.01); *H04N 1/00912* (2013.01); *H04N 1/233* (2013.01); *H04N 2201/0094* (2013.01)

(58) Field of Classification Search
CPC combination set(s) only.
See application file for complete search history.

(56) References Cited

U.S. PATENT DOCUMENTS

2014/0153021 A1    6/2014  Matsumoto

FOREIGN PATENT DOCUMENTS

JP        2014-108614 A    6/2014

*Primary Examiner* — Barbara D Reinier
(74) *Attorney, Agent, or Firm* — Banner & Witcoff, Ltd.

(57) ABSTRACT

There is provided a controller configured to execute: obtaining of color values of picture elements, respectively, of P pieces of target picture element columns; identifying of a blank picture element, indicating a white color as a brightest color; and identifying a candidate picture element line as a blank line which is a picture element line indicating the white color as the brightest color, the candidate picture element line being constructed of T pieces of picture elements arranged side by side in a second direction and including the P pieces of target picture elements located at a same position in the first direction, in a case that the candidate picture element line satisfies a first blank line condition, wherein the P is a integer in a range of not less than 2 to less than the T.

17 Claims, 14 Drawing Sheets

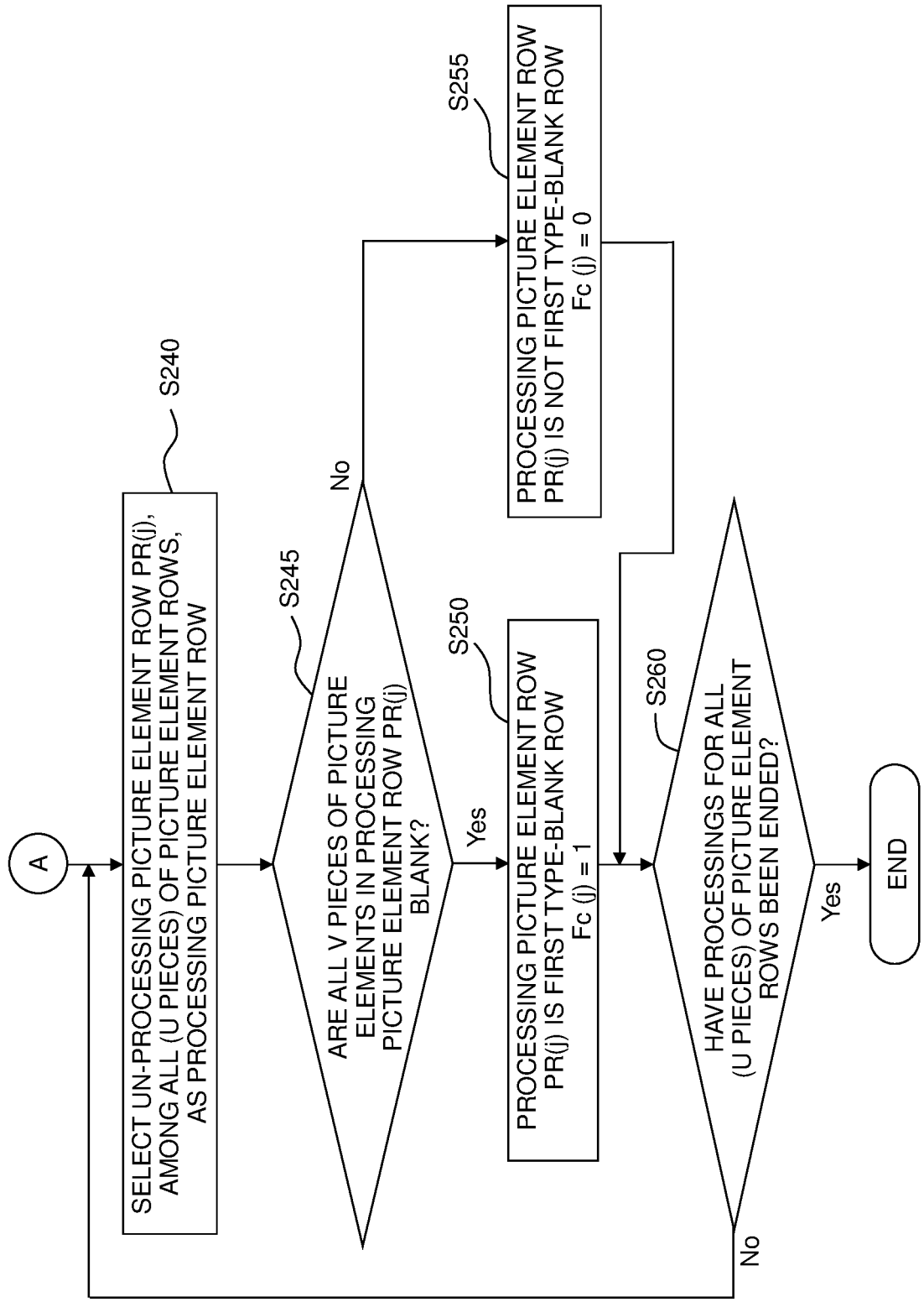

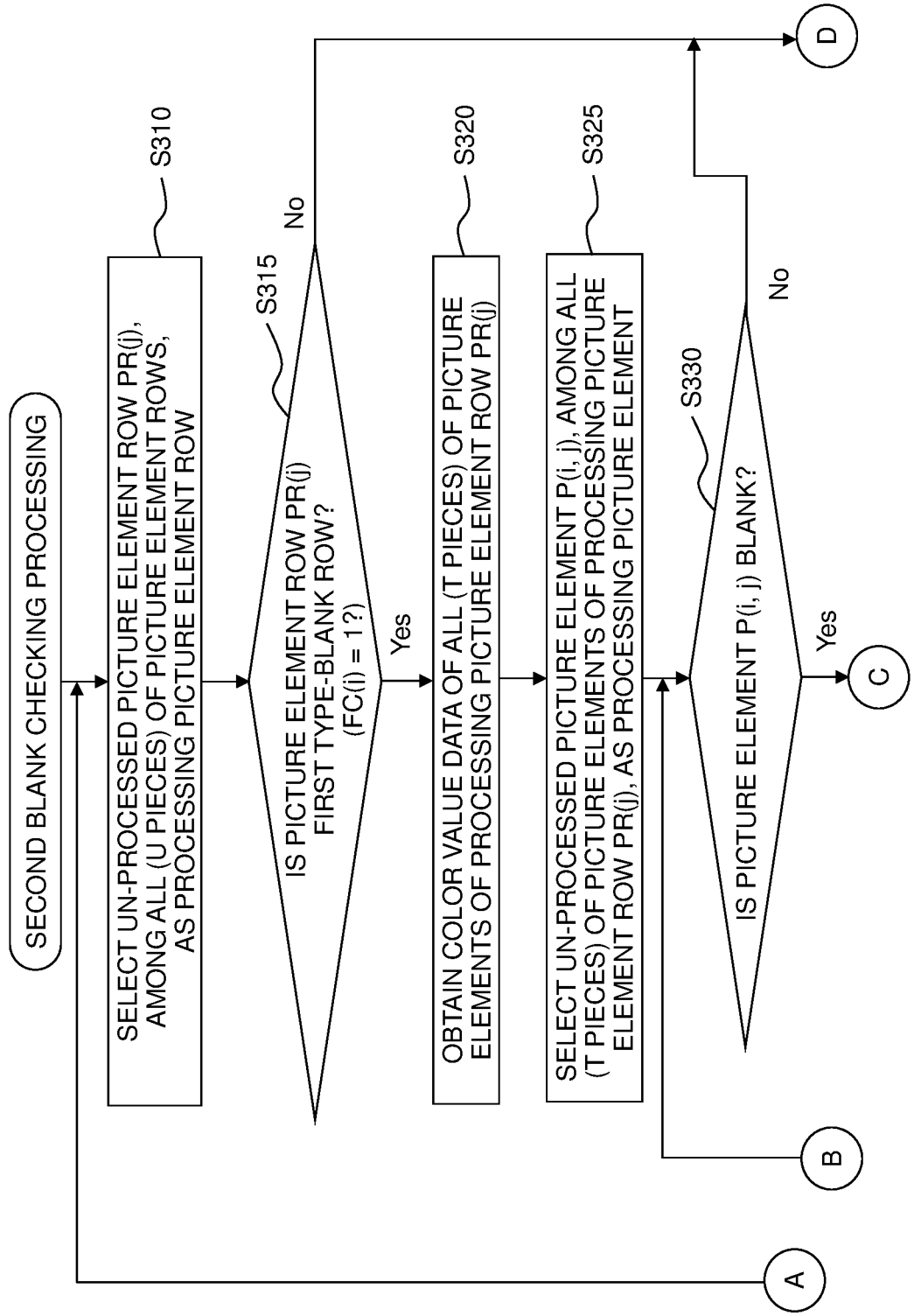

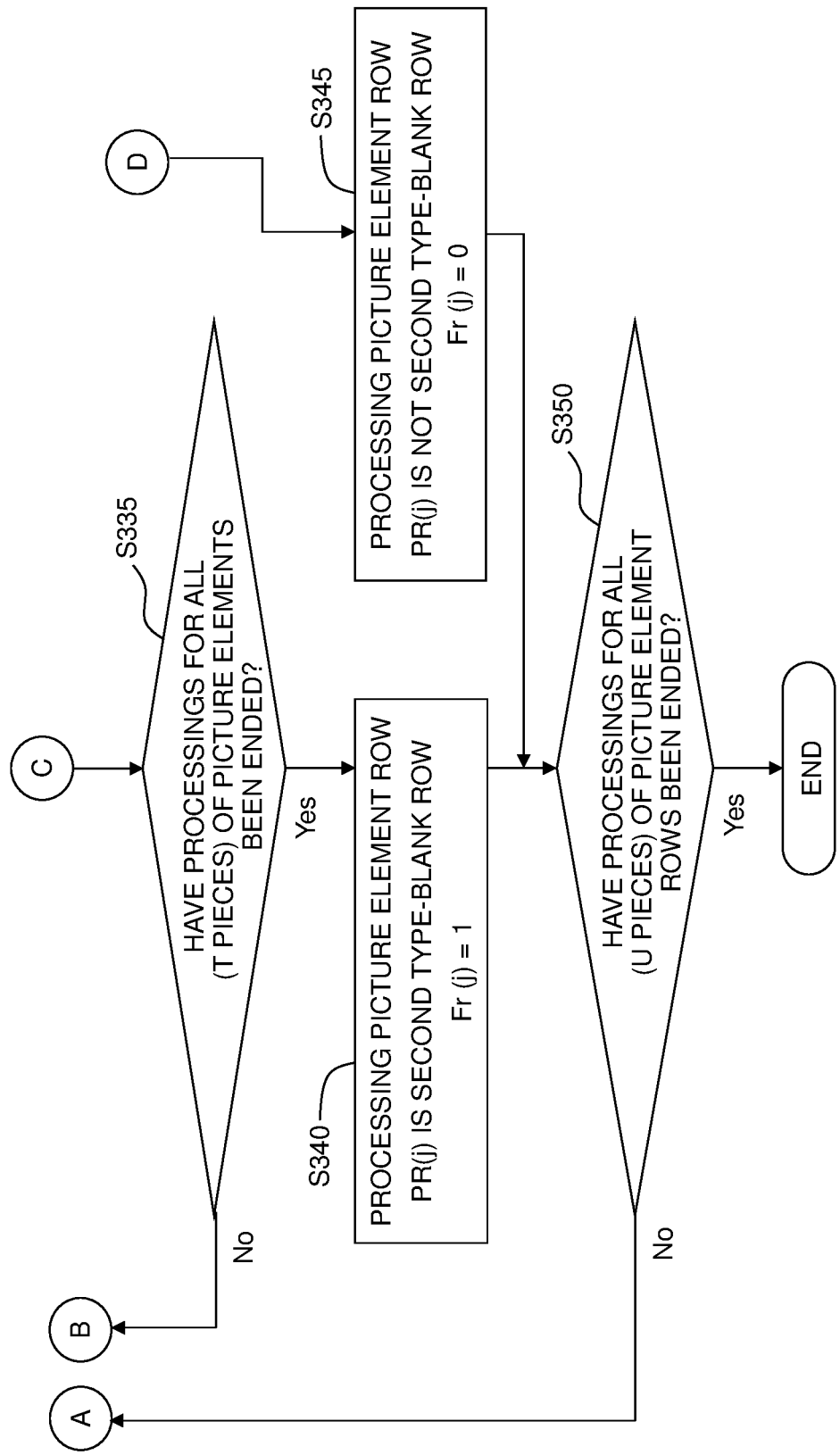

CONTROLLER, PRINTER AND NON-TRANSITORY COMPUTER-READABLE MEDIUM STORING COMPUTER PROGRAM REDUCING THE TIME FOR IDENTIFYING A BLANK LINE IN IMAGE DATA

CROSS REFERENCE TO RELATED APPLICATION

The present application claims priority from Japanese Patent Application No. 2018-207261 filed on Nov. 2, 2018, the disclosure of which is incorporated herein by reference in its entirety.

BACKGROUND

Field of the Invention

The present disclosure is related to a controlling processing for forming an image on a printing medium by using a coloring material.

Description of the Related Art

Conventionally, there is known a printer which discharges or jets an ink from a print head so as to print an image. Further, there is proposed such a technique wherein, in a case that a record image includes a blank image of which width is not less than the width of a recording head, skipping of blank (blank skipping) is performed in a blank part of the record image; in the blank skipping, only conveyance of a sheet is performed but any image formation with the scanning of the recording head is not performed, for the purpose of speeding up the printing. Further, there is also suggested such a technique wherein a blank skipping function is switched ON and OFF for each printing mode; in a case that the blank skipping function is OFF, detection of blank (blank detection) is not performed to thereby suppress any prolongation of printing time.

For the blank detection, determination is made for each of the lines successively as to whether or not any blank data is included in the image data. As a result, a long period of time is required for the blank detection. Such a problem that a long period of time is required for the blank detection is not limited only to a case of controlling the printer having a print head, but is common in a case of controlling various kinds of printers such as a laser printer, etc.

This specification of the present disclosure discloses a technique capable of shortening the time required for identifying a blank (blank part or blank portion).

According to a first aspect of the present disclosure, there is provided a controller configured to cause a printing apparatus to perform printing of an image, the printing apparatus including a printer part configured to form the image on a medium by using a coloring material, and a conveyor configured to convey the medium in a first direction relative to the printer part. The controller is configured to execute: obtaining of color values of a plurality of picture elements, respectively, of P pieces of target picture element lines which are included in a target image as a target to be printed and which extend in the first direction; identifying of a blank picture element, which is a picture element indicating a white color as a brightest color, among the plurality of picture elements of the P pieces of the target picture element lines by using the color values of the plurality of picture elements, respectively, of the P pieces of the target picture element lines; and identifying a candidate picture element line as a blank line which is a picture element line indicating the white color as the brightest color, the candidate picture element line being a picture element line which is constructed of T pieces of picture elements arranged side by side in a second direction orthogonal to the first direction and which includes the P pieces of target picture elements each selected from one of the P pieces of the target picture element lines and located at a same position in the first direction, in a case that the candidate picture element line satisfies a first blank line condition that all the P pieces of the target picture elements included in the candidate picture element line are each the blank picture element. The P is a integer in a range of not less than 2 to less than the T.

According to this configuration, the blank line is identified by using the picture elements which are a part of the plurality of picture elements of the target image, thereby making it possible to shorten the time required for identifying the blank line.

According to a second aspect of the present disclosure, there is provided a controller configured to cause a printing apparatus to perform printing of an image, the printing apparatus including a printer part configured to form the image on a medium by using a coloring material, and a conveyor configured to execute conveyance of moving the medium in a first direction relative to the printer part. The controller is configured to execute: obtaining color values of a plurality of picture elements, respectively, of Q pieces of target picture element lines which are included in a target image as a target to be printed and which extend in the first direction; identifying of a blank picture element, which is a picture element indicating a white color as a brightest color, among the plurality of picture elements of the Q pieces of the target picture element lines, by using the color values of the plurality of picture elements, respectively, of the Q piece of the target picture element lines; obtaining of color values of T pieces of picture elements, respectively, of a candidate picture element line, the candidate picture element line being a picture element line which is constructed of the T pieces of the picture elements arranged side by side in a second direction orthogonal to the first direction and which includes the Q pieces of target picture elements each selected from one of the Q pieces of the target picture element lines, all of the Q pieces of the target picture elements being each the blank picture element; identifying of the blank picture element among the T pieces of the picture elements of the candidate picture element line, by using the color values of the T pieces of the picture elements, respectively, of the candidate picture element line; and identifying the candidate picture element line as a blank line which is a picture element line indicating the white color as the brightest color, in a case that the candidate picture element line satisfies a second blank line condition that all the T pieces of the picture elements of the candidate picture element line are each the blank picture element. The Q is a integer in a range of not less than 1 to less than the T.

According to this configuration, the blank line is identified by using the picture elements which are a part of the plurality of picture elements of the target image, thereby making it possible to shorten the time required for identifying the blank line.

Note that the technique disclosed in the specification of the present disclosure can be realized in a various kind of aspects including, for example, a controlling method and a controller for a printer part (printer), a printing method and a printing apparatus, a non-transitory computer-readable medium storing a computer program for realizing the above-described methods or the functions of the above-described apparatuses, and the like.

BRIEF DESCRIPTION OF THE DRAWINGS

FIGS. 6A and 6B depict a flowchart depicting an example of a first blank checking processing.

FIGS. 7A and 7B depict a flowchart depicting an example of a second blank checking processing.

DESCRIPTION OF THE EMBODIMENTS

First Embodiment

<Configuration of Multi-Function Peripheral 200>

Figure 1:
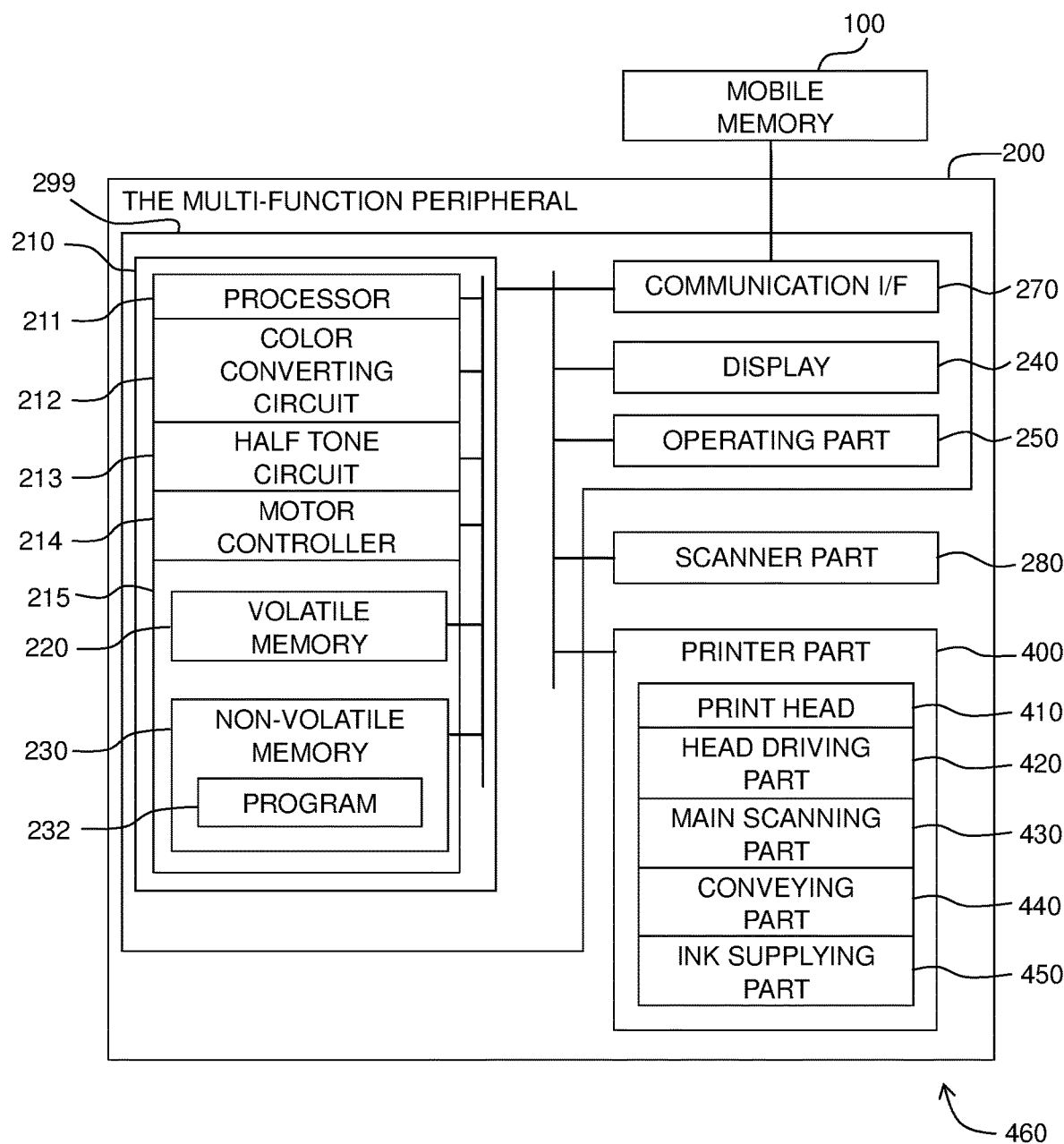
FIG. 1 is an explanatory view depicting a multi-function peripheral 200.

As depicted in FIG. 1, a multi-function peripheral 200 has a controller 299, a scanner part 280 and a printer part 400. The controller 299 has a data processing device 210, a display 240 configure to display an image, an operating part 250 configured to receive an operation by a user and a communication interface 270. These elements are connected to one another via a bus.

The data processing device 210 is an electrical circuit configured to execute a variety of kinds of data processing. The data processing device 210 has a processor 211, a color converting circuit 212, a half tone circuit 213, a motor controller 214 and a memory 215. The memory 215 includes a volatile memory 220 and a non-volatile memory 230. The data processing device 210 is constructed, for example, by using an ASIC (Application Specific Integrated Circuit).

The processor 211 is, for example, a CPU, and is configured to perform data processing in accordance with a program. The processor 211 executes a program 232 stored in the non-volatile memory 230 to thereby realize a variety of kinds of functions. In the present embodiment, the program 232 is stored in advance, as a firmware, in the non-volatile memory 230 by the manufacturer of the multi-function peripheral 200.

The color converting circuit 212 is an electrical circuit configured to perform a color converting processing. The half tone circuit 213 is an electrical circuit configured to perform a half tone processing. The motor controller 214 is an electrical circuit configured to control the printer part 400 (specifically, a motor, etc.). At least one of these electrical circuits 212, 213 and 214 may be constructed by using a FPGA (Field-programmable gate array). The volatile memory 220 is, for example, a DRAM; the non-volatile memory 230 is, for example, a flash memory.

The processor 211, the color converting circuit 212, the half tone circuit 213 and the motor controller 214 store a variety of kinds of intermediate data used in the data processing temporarily in the memory (for example, either one of the volatile memory 220 and the non-volatile memory 230).

The display 240 is, for example, a liquid crystal display, and is configured to display an image. Instead of the liquid crystal display, it is allowable to adopt a device of different kind configured to display an image, such as a LED display, an organic EL display, etc. The operating part 250 is a device configured to receive an instruction from the user; the operating part 250 is, for example, a touch panel arranged on and overlapping with the display 240. Instead of the touch panel, it is allowable to adopt a device of different kind which is operable by the user, such as a button, lever, etc. The user is allowed to input a variety of kinds of instructions to the multi-function peripheral 200 by operating the operating part 250.

The communication interface 270 is an interforce for communicating with another apparatus or device. In the present embodiment, the communication interface 270 includes a so-called USB interface. A mobile memory 100 such as a USB flash drive, etc., is connectable to the communication interface 270.

The scanner part 280 optically reads a target or object such as a manuscript (original) by using a photoelectric conversion element such as a CCD, CMOS, etc., to thereby generate scan data representing a read image (hereinafter referred to as a "scan image"). The scan data is, for example, RGB bitmap data representing a color scan image.

The printer part 400 is a device configured to print an image on a paper sheet (paper; an example of a print medium). In the present embodiment, the printer part 400 has a print head 410 (also referred to simply as "head 410"), a head driving part 420, a main scanning part 430, a conveyor 440, and an ink supplying part 450. Although the specific of the printer part 400 will be described later on, the printer part 400 is a printing device or apparatus of the ink-jet system using a cyan ink C, a magenta ink M, a yellow ink Y and a black ink K. Note that the combination of a plurality kinds of usable inks is not limited to or restricted by the CMYK combination, and a variety of other kinds of combinations (for example, a combination of cyan C, magenta M and yellow Y) are also adoptable.

The multi-function peripheral 200 is capable of using image data selected by the user so as to generate print data, and of using the generated print data so as to cause the printer part 400 to print an image therewith. The user is allowed to perform selection among scan data, image data stored in an external device or apparatus (for example, a mobile memory 100 connected to the communication interface 270, etc.), and the like. Further, the multi-function peripheral 200 is capable of using print data supplied thereto by another device or apparatus (for example, a personal computer) communicable with the multi-function peripheral 200 via the communication interface 270 so as to cause the printer part 400 to print an image.

Figure 2:
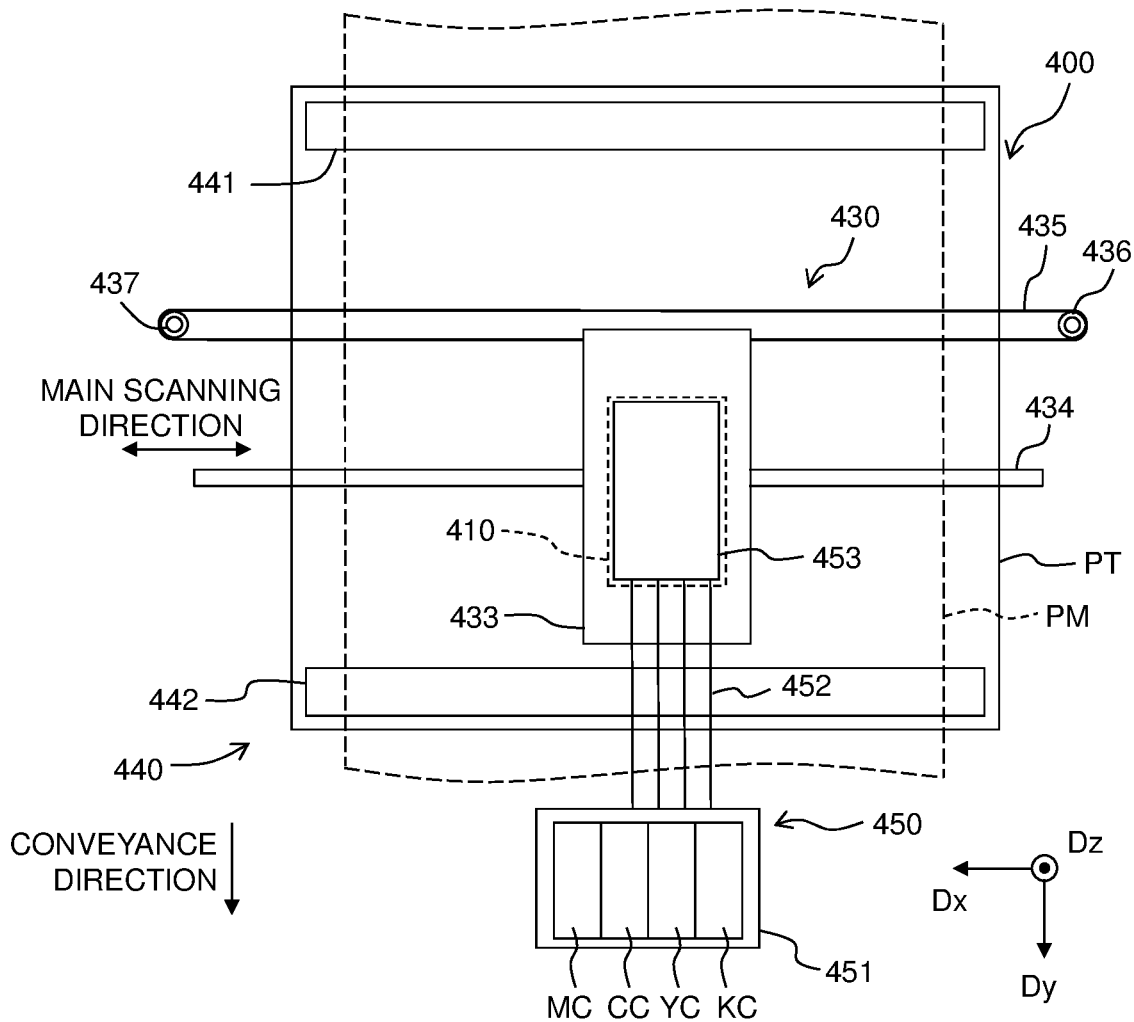
FIG. 2 is a schematic view of a printer part 400.

As depicted in FIG. 2, the main scanning part 430 is provided with a carriage 433, a sliding shaft 434, a belt 435 and a plurality of pulleys 436 and 437. The carriage 433 has the print head 410 mounted thereon. The sliding shaft 434 holds the carriage 433 to be reciprocally movable in a main scanning direction (direction parallel to a Dx axis in FIG. 2). The belt 435 is wound around the pulleys 436 and 437, and a part or portion of the belt 435 is fixed to the carriage 433. The pulley 436 is rotated by the motive power from a non-illustrated main scanning motor. In a case that the main scanning motor rotates the pulley 436, the carriage 433 is moved along the sliding shaft 434, thereby realizing a main scanning of causing the print head 410 to reciprocate along the main scanning direction relative to a paper sheet PM.

The conveyor 440 conveys the paper sheet PM in a conveyance direction orthogonal to the main scanning direction (+Dy direction in FIG. 2) relative to the print head 410, while holding the paper sheet PM. Here, the upstream side in the conveyance direction (−Dy side) is simply referred to as "upstream side", and the downstream side in the conveyance direction (+Dy side) is simply referred to as "downstream side", as well. The conveyor 440 is provided with: a platen PT configured to support the paper sheet PM and arranged at a locating facing or opposite to a surface, of the print head 410, from which the inks are discharged or jetted; an upstream roller 441 and a downstream roller 442 each of which is configured to hold the paper sheet PM placed on the platen PT; and a non-illustrated motor which drives the upstream roller 441 and downstream roller 442. The upstream roller 441 is arranged on the upstream side of the print head 410, and the downstream roller 442 is arranged on the downstream side of the print head 410. The paper sheet PM is supplied to the conveyor 440 from a non-illustrated paper sheet tray by a non-illustrated paper sheet feeding roller. The paper sheet PM supplied to the conveyor 440 is sandwiched between the platen PT and the upstream roller 441, and is conveyed by the upstream roller 441 toward the downstream side. The conveyed paper sheet PM is sandwiched between the platen PT and the downstream roller 442, and is conveyed by the downstream roller 442 toward the downstream side. The conveyor 440 conveys the paper sheet PM in a conveyance direction Dy by driving these rollers 441 and 442 with the motive power of the motor. In the following, a processing for causing the paper sheet PM to move in the conveyance direction Dy is also referred to as "sub scanning" or "conveying operation". The conveyance direction Dy is referred also to as a "sub scanning direction Dy", as well.

The ink supplying part 450 supplies the inks to the print head 410. The ink supplying part 450 is provided with a cartridge installing part 451, tubes 452 and a buffer tank 453. A plurality of ink cartridges KC, YC, CC and MC each of which is a container storing an ink therein are detachably attached to the cartridge installing part 451, and the inks are supplied from these ink cartridges KC, YC, CC and MC, respectively. The buffer tank 453 is arranged in the carriage 433 at a location above or over the print head 410, and temporarily stores the inks to be supplied to the print head 410 in separate manners with respect to the CMYK inks, respectively. Each of the tubes 452 is a flexible tube connecting the cartridge installing part 451 and the buffer tank 453 and serving as a flow path or flow channel (channel) for one of the inks. The inks in the respective ink cartridges are supplied to the print head 410 via the cartridge installing part 451, the tubes 452 and the buffer tank 453. The buffer tank 453 is provided with a filter (not depicted in the drawings) configured to remove any foreign matter which enters into and is mixed with the ink.

Figure 3:
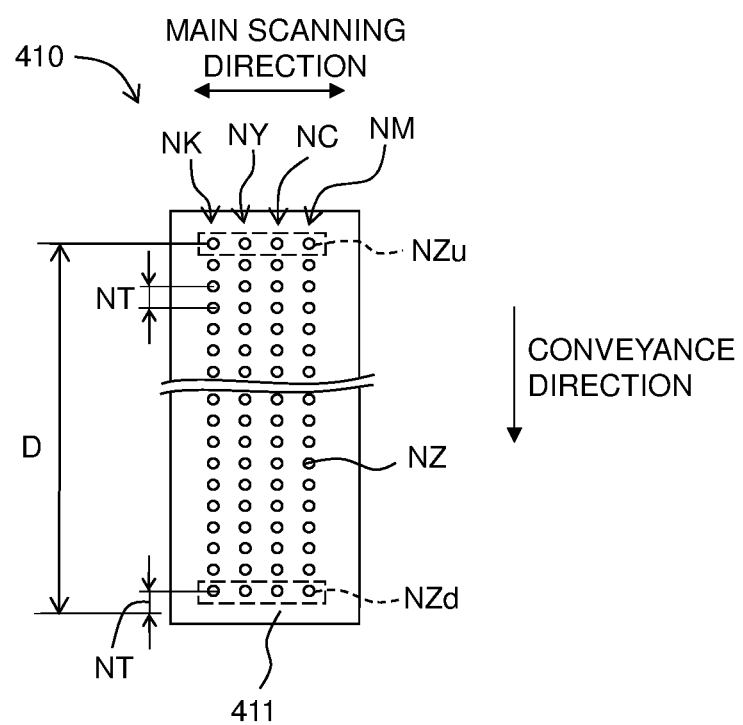
FIG. 3 is a view depicting the configuration of a print head 410.

As depicted in FIG. 2, a Dz direction is a direction which is perpendicular to the two directions Dx and Dy and which is oriented from the platen PT toward the head 410. A nozzle formation surface 411 of the print head 410 depicted in FIG. 3 is a surface facing or opposite to the paper sheet PM which is (being) conveyed by the conveyor 440 (FIG. 2). A plurality of nozzle groups constructed of a plurality of nozzles NZ, namely, nozzle groups NC, NM, NY and NK which discharge or jet the above-described C, M, Y and K inks, respectively, are formed in the nozzle formation surface 411. Each of the nozzle groups includes a plurality of nozzles NZ. Among the plurality of nozzles NZ in one nozzle group, the positions of the nozzles NZ in the conveyance direction (+Dy direction) are mutually different, and the plurality of nozzle NZ are arranged side by side in the conveyance direction at a predetermined nozzle interval NT. The nozzle interval NT is a distance between two nozzles NT which are included in the plurality of nozzles NZ, and which are adjacent in the conveyance direction. Among the nozzles NZ constructing each of the nozzle groups, a nozzle NZ located on the upstream-most side (−Dy side) is referred to as a upstream-most nozzle NZu, as well. Further, among the nozzles NZ constructing each of the nozzle groups, a nozzle NZ located on the downstream-most side (+Dy side) is referred to as a downstream-most nozzle NZd, as well. Furthermore, a distance obtained by further adding the nozzle interval NT to a length in the conveyance direction from the upstream-most nozzle NZu up to the downstream-most nozzle NZd is referred to as a nozzle length D, as well.

Positions in the main scanning direction of the nozzle groups NC, NM, NY and NK are mutually different, and positions in the sub scanning direction of the nozzle groups NC, NM, NY and NK are mutually overlapped. In the example depicted in FIG. 3, the nozzle groups NK, NY, NC and NM are aligned in this order toward the +Dx direction.

The nozzles NZ are connected to the buffer tank 453 (FIG. 2) via ink channels, respectively (not depicted in the drawings) formed in the inside of the print head 410. An actuator (not depicted in the drawings; for example, a piezoelectric element, a heater, etc.) configured to cause the ink to be discharged is provided on each of the ink channels.

The head driving part 420 (FIG. 1) includes an electric circuit configured to drive each of the actuators in the inside of the print head 410 during the main scanning performed by the main scanning part 430. With this, the inks are discharged from the nozzles NZ of the print head 410 onto the paper sheet PM, thereby forming dots. In such a manner, the print heat 410, the head driving part 420 and the main scanning part 430 form an image on the paper sheet PM by using the inks. In the following, the print heat 410, the head driving part 420 and the main scanning part 430 as a whole are referred to as an image forming part 460.

<Brief Overview of Printing>

The multi-function peripheral 200 prints an image on the paper sheet PM by executing, a plurality of times, a partial printing of causing the print head 410 to discharge an ink(s) to thereby form dots on the paper sheet PM, while causing the main scanning part 430 to execute the main scanning, and sub scanning (conveyance of the paper sheet PM) performed by the conveyor 440.

Figure 4:
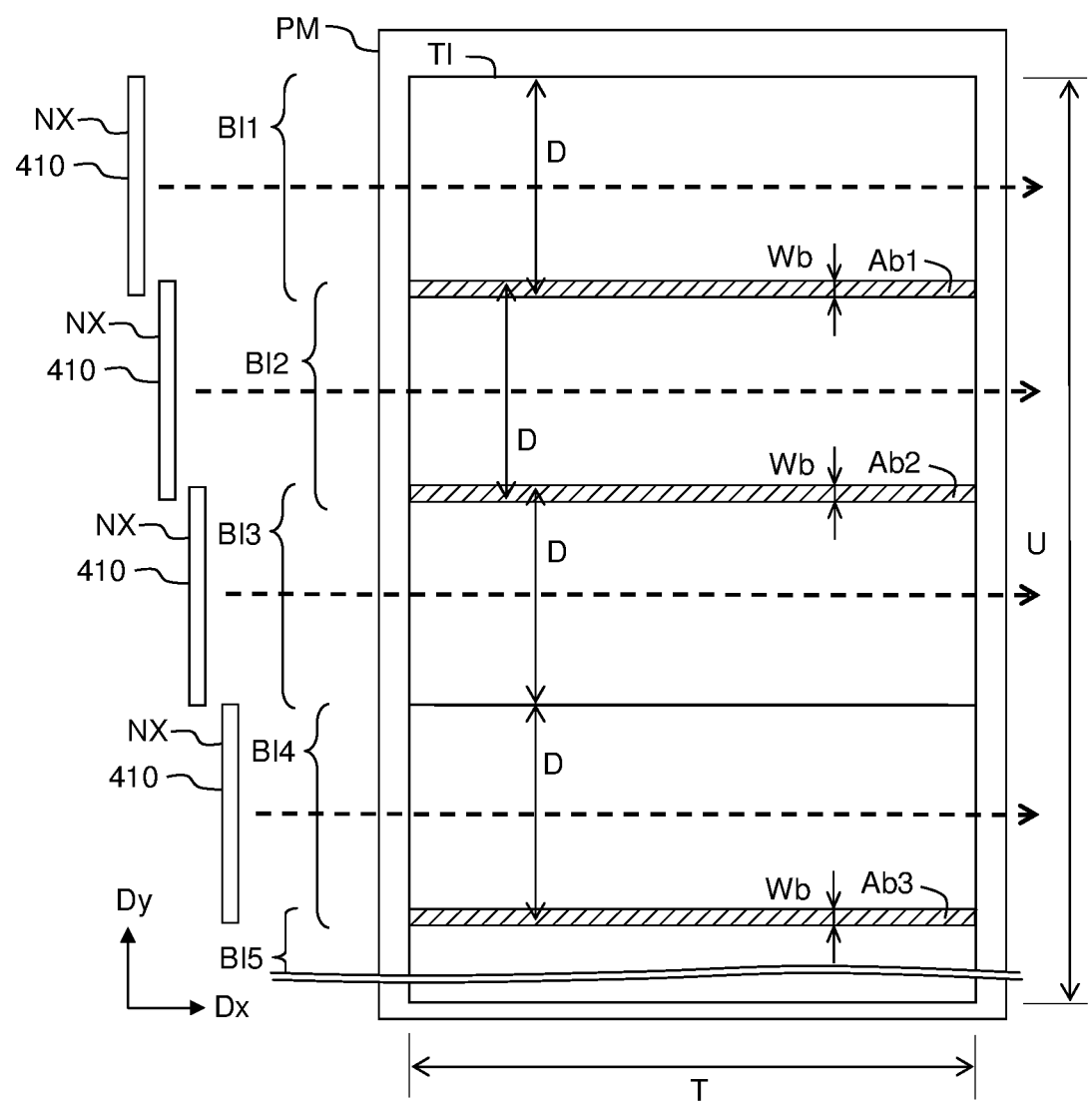
FIG. 4 is an explanatory view of an example of an operation of the printer part 400.

FIG. 4 depicts a target image TI which is to be printed on the paper sheet PM. In FIG. 4, the +Dy direction is the conveyance direction of the paper sheet PM (namely, the sub scanning direction). A plurality of band areas (including band areas BI1 to BI5) which are arranged side by side in the −Dy direction (more generally, in the sub-scanning direction). The shape of each of the band areas is a rectangular shape elongated (extending) in the main scanning direction (here, a direction parallel to the Dx direction). In the present embodiment, each of the band areas indicates a print-target area for one partial printing (one time of the partial printing). Nozzle groups NX, of the print head 410, each of which is configured to print an image of one of the band areas and which are depicted in a simplified manner are indicated on the left side of the band areas BI1 to BI4, respectively. The nozzle groups NX are depicted as representing, respectively, the nozzle groups NC, NM, NY and NK depicted in FIG. 3. The width in the sub scanning direction of each of the band areas is determined in advance; in the present embodiment, the width in the sub scanning direction of each of the band areas is same as the nozzle length D (FIG. 3). Further, in the present embodiment, a printing direction of each of the band areas (namely, a moving direction of the print head 410) is the +Dx direction. In the following, one partial printing (one time of partial printing) is referred to as "pass processing" or simply as a "pass", as well.

Images of the plurality of band areas, respectively, are printed sequentially one by one from an image of the band area on the side of an end part in the +Dy direction of the target image TI toward the −Dy direction. By doing so, the entirety of the target image TI is printed. Normally, two band areas which are adjacent to each other are partially overlapped with each other at parts or portions thereof, respectively. Overlap areas Ab1 to Ab3 in FIG. 4 each indicate an area at which two adjacent band areas are overlapped. Specifically, the overlap area is such an area wherein ranges in the sub scanning direction of the two band areas, respectively, are overlapped with each other. For example, the first overlap area Ab1 is an area at which the first band area BI1 and the second band area BI2 are overlapped with each other. The shapes of such overlap areas Ab1 to Ab3 are each a rectangular shape extending in the main scanning direction. A width Wb is the width in the sub scanning direction of each of the overlap areas Ab1 to Ab3, and is determined in advance (is a predetermined width). The plurality of picture elements of each of the overlap areas are printed in a manner divided (dispersed) in two partial printings (two times of partial printing). Namely, among the picture elements in the overlap area, a part of the picture elements is printed during the printing of a band area on the upstream side, and a remainder of the picture elements are printed during the printing of another band area on the downstream side. The arrangement of the picture elements corresponding to the two band areas, respectively, in the overlap area may include a variety of kinds of arrangement. For example, it is allowable that the picture elements of the two band areas, respectively, are uniformly arranged. In the present embodiment, the arrangement of the picture elements of each of the two band areas in the overlap area is determined in advance. Note that in FIG. 4, the fourth band area BI4 is adjacent to the third band area BI3, without overlapping with the third band area BI3. As described above, there is such a case that the two adjacent band areas are arranged so as not to overlap with each other (the details of which will be described later on).

<Print Processing>

An explanation will be given about a print processing, with reference to FIGS. 5 to 8. FIGS. 6, 7 and 8 depict, respectively, processing of steps S130, S160 and S180 in FIG. 5. The multi-function peripheral 200 starts the print processing in accordance with a print instruction. The method for supplying the print instruction to the multi-function peripheral 200 may be an arbitrary method. In the present embodiment, the user operates the operating parts 250 (FIG. 1) to thereby input the print instruction. The print instruction includes information specifying image data for printing (print image data). As the print image data, a variety of kinds of data may be specified. In the following, it is provided that JPEG data stored in the mobile memory 100 is specified.

In step S105, the processor 211 obtains target image data as image data of a target image which is an image to be printed, in accordance with the print instruction. In the present embodiment, bitmap data is used as the target image data. Further, it is provided that picture element values of the respective picture elements of the target image data are indicated by gradation values R (red) G (green) B (blue) of the 256 gradations from 0 to 255. In a case that the image data specified by the print instruction is JPEG data, the processor 211 obtains the target image data by developing the JPEG data. In a case that the format of the image data specified by the print instruction is of a format different from the bitmap format (for example, a EMF (Enhanced Meta File) format), the processor 211 uses bitmap data generated by converting (for example, rasterizing) the data format, as the target image data. Further, in a case that the resolution of the bitmap data (namely, the picture element density) is different from a resolution for printing (print resolution) determined in advance, the processor 211 executes a resolution converting processing so as to generate target image data having the print resolution. In the following, a picture element having (with) the print resolution are referred also to as a "print picture element".

In step S110, the color converting circuit 212 (FIG. 1) executes the color converting processing of the target image data. The color converting processing is a processing of converting color values (in the present embodiment, the RGB values) indicated by the target image data into color values of an ink color space. The ink color space is a color space corresponding to the color of each of the plurality of kinds of color inks which are usable for the printing. The color values of the ink color space include a plurality of component values corresponding to a plurality of kinds of colors of the inks (in the present embodiment, the CMYK values). In the present embodiment, the color converting circuit 212 refers to a color conversion profile to thereby execute the color converting processing. The color converting profile is data indicating the corresponding relationship between the color values of a target color space as the color space of the target image data and the color values of the ink color space. In the present embodiment, a predetermined lookup table is used as the color conversion profile (not depicted in the drawings). The color converting circuit 212 refers to the lookup table so as to convert the color values of the respective picture elements indicated by the target image data into the color values of the ink color space. The color converting circuit 212 stores the target image data for which the color conversion has been performed (color-converted target image data) to the memory 215 (either one of the volatile memory 220 and the non-volatile memory 230).

In step S120, the half tone circuit 213 executes the half tone processing for the color-converted target image data. The half tone processing may be processings of a variety of kinds of methods including, for example, the error diffusion method, a method using the dither matrix, etc. By the half tone processing, dot data indicating a dot formation state for each of the color components and for each of the print picture elements is generated. The half tone processing circuit 213 stores the generated dot data to the memory 215 (either one of the volatile memory 220 and the non-volatile memory 230). The dot formation state is the state of a dot to be formed by the printing; in the present embodiment, the dot formation state is ether one of "dot is present" or "no dot". Instead of this, it is allowable that the dot formation state is selected from three or more states including two or more of "dot is present" states of which dot size are mutually different (for example, "large dot", "middle dot", "small dot" and "no dot"). In any case, the dot data indicates a value corresponding to the dot formation state.

Figure 9:
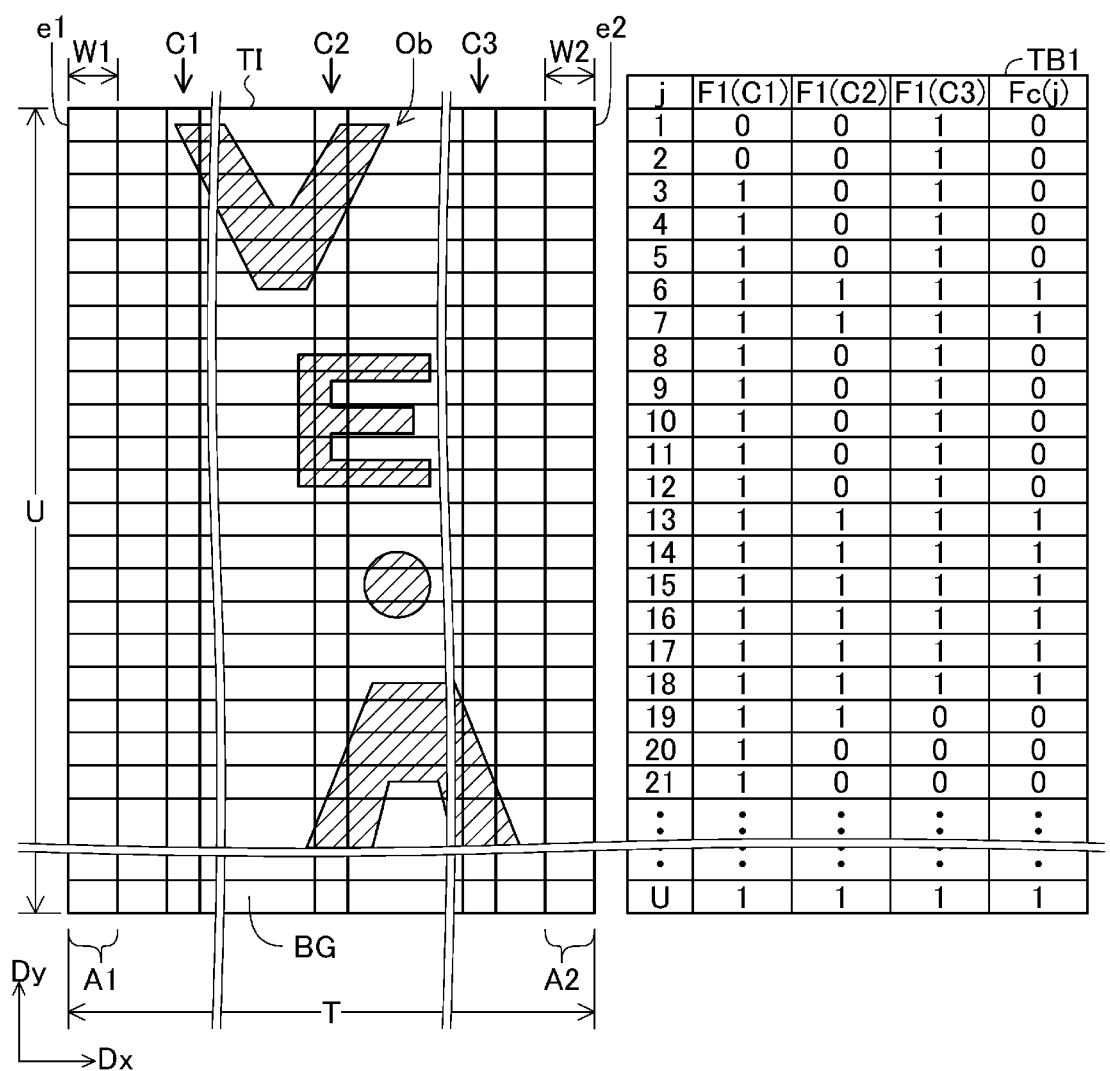
FIG. 9 is a schematic view depicting an example of a target image TI and a result of checking.

In step S130, the processor 211 executes a first blank checking processing of the target image data. FIG. 9 is a schematic view depicting an example of the target image TI and a result of checking. An example of the target image TI is indicated at a left part of FIG. 9. The target image TI indicates a variety of kinds of objects Ob such as a letter, a figure (graphic), etc., and a background BG. In FIG. 9, the object OB is hatched. The target image TI is represented by a plurality of picture elements which are arranged in a grid-like manner along the Dx direction and the Dy direction (not depicted in the drawings). In the following, a picture element line extending in the main scanning direction (direction parallel to the Dx direction) is referred also to as an "picture element row". The picture element line is formed of a plurality of picture elements arranged side by side in the main scanning direction. Further, a picture element line extending in the sub scanning direction Dy is referred also to as a "picture element column" The picture element column is formed of a plurality of picture elements arranged side by side in the sub scanning direction Dy. A value "T" in FIG. 9 is a total number of the picture element columns included in the target image TI. The number in the main scanning direction of the picture elements (namely, the size in the main scanning direction) of the target image TI is T pieces. One piece of picture element row (one picture element row) is constructed of the T pieces of the picture elements arranged side by side in the main scanning direction. A value "U" is a total number of the picture element rows included in the target image TI. The number in the sub scanning direction of the picture elements (namely, the size in the sub scanning direction) of the target image TI is U pieces. In the following, the position in the Dx direction of a picture element in the inside of the target image TI is referred also to as a "column number". The column number is designated sequentially from 1 (one) to be arranged in an ascending order toward the Dx direction. Further, the position in the –Dy direction of a picture element in the inside of the target image TI is referred also to as a "row number". The row number is designated sequentially from 1 (one) to be arranged in an ascending order toward the –Dy direction.

Figure 6A:
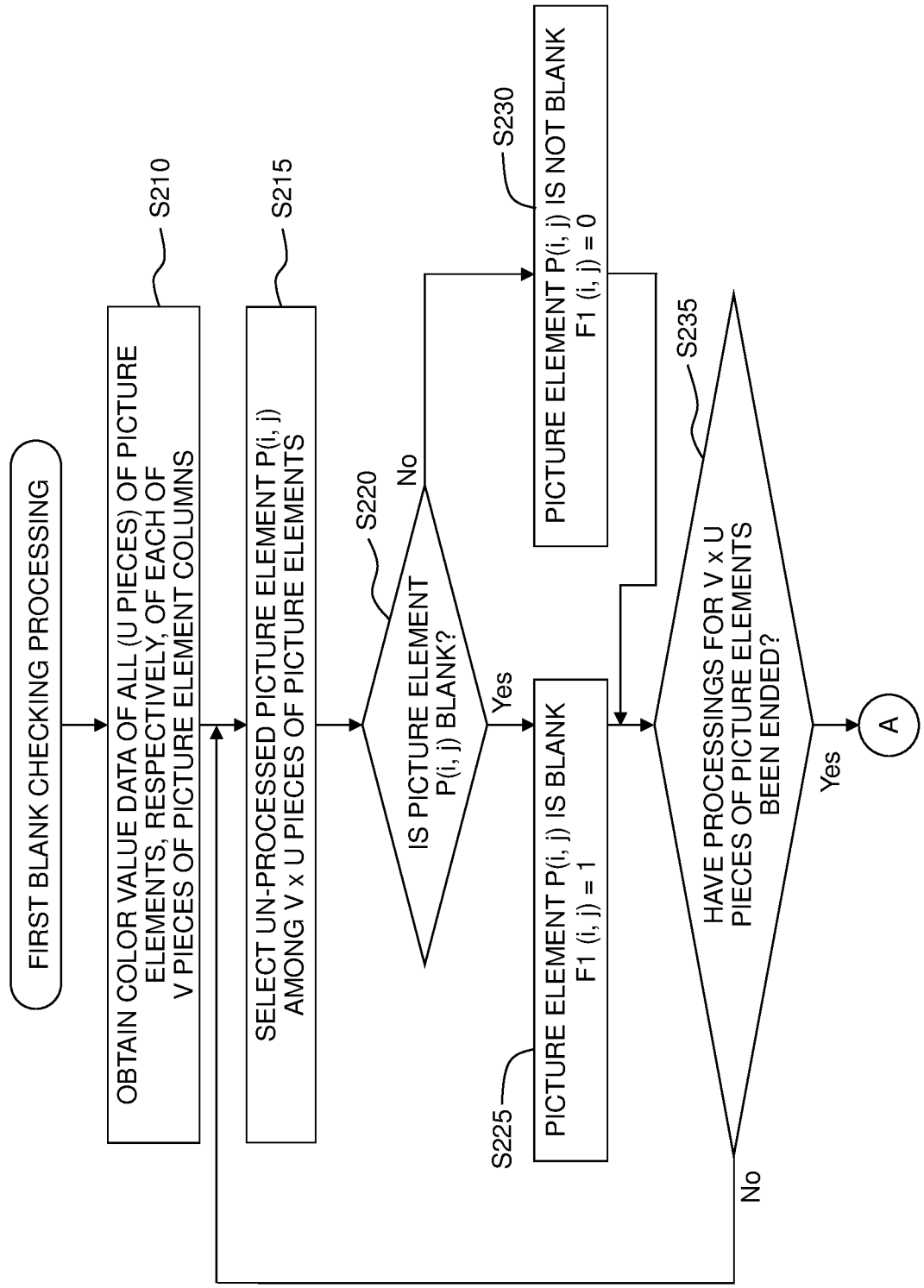

In the first blank checking processing depicted in FIGS. 6A and 6B, a blank row is identified by using V pieces of picture element columns which is a part or portion of T pieces of picture element columns included in the target image TI (V<T). In the following, the V pieces of the picture element columns used in the first blank checking processing are referred to as target picture element columns, or target picture element lines. In the present embodiment, it is provided that 3 (three) pieces of target picture element columns which are determined in advance are used (V=3). Picture element rows C1, C2 and C3 in FIG. 9 indicate the target picture element columns.

In step S210 (FIG. 6A), the processor 211 obtains the color values of all the picture elements in the V pieces of the target picture element columns (namely, V×U pieces of picture elements) from the plurality of picture elements included in the target image TI. In the following, the picture elements of the V pieces of the target picture element columns are referred also to as "target picture elements". In the present embodiment, the dot data is obtained from the memory 215 as the color value data of the target image elements.

In processings of steps S215 to S235, the processor 211 identifies a blank picture element among the plurality of target picture elements, and sets a blank picture element flag F1 which indicates the result of identification. Specifically, in step S215, the processor 215 selects a un-processed target picture element from the plurality of target picture elements, as a processing picture element which is a picture element to be used in a determining processing (to be described later on). In the following, a column number of the processing picture element is "i", and a row number of the processing picture element is "j". Further, a picture element of which column number is "i" and row number is "j" is indicated as a picture element P (i, j).

In step S220, the processor 211 determines as to whether or not the processing picture element P (i, j) is a blank picture element. The blank picture element is a picture element for which the ink is not discharged. The processor 211 determines that the processing picture element is the blank element in a case that the color value of the processing picture element indicates "no dot". In the target image TI depicted in FIG. 9, the color values of the picture elements indicating the background BG indicate "no dot", and the color values of the picture elements indicating the object Ob indicate "dot is present". In the following, a picture element indicating the dot formation state which is different from the "no dot" is referred also to as a "non-blank picture element".

In a case that the processing picture element P (i, j) is determined as being the blank picture element (S220: YES), the processor 211 sets, in step S225, the blank picture element flag F1 of the picture element P (i, j) (referred to as "blank picture element flag F1 (i, j)") to be "1" (one) representing the blank picture element, and proceeds the processing to step S235. In a case that the processing picture element P (i, j) is determined as being the non-blank picture element (S220: NO), the processor 211 sets, in step S230, the blank picture element flag F1 (i, j) of the picture element P (i, j) to be "0" (zero) representing the non-blank picture element, and proceeds the processing to step S235. Note that in each of step S225 and step S230, the processor 211 stores the data indicating the set blank picture element flag F1 (i, j) to the memory 215 (either one of the volatile memory 220 and the non-volatile memory 230).

A table TB1 indicating an example of the blank picture element flag F1 is indicated at a right part of FIG. 9. This table TB1 indicates the relationship between the row number j and the blank picture element F1. As the blank picture element flag F1, the blank picture element flags F1 of each of the three target picture element columns C1, C2 and C3 are indicated. The row numbers j are arranged sequentially from 1 (one), from an upper position toward a lower position of FIG. 9. The row number j and the descriptive position in the longitudinal (lengthwise) direction of a blank picture element flag F1 in the table TB1 correspond to the position in the longitudinal direction (namely, the position in the conveyance direction Dy) of a picture element of the same row number j in the target image Ti in the left part of FIG. 9. Note that in FIG. 9, the width of one piece of picture element line (consequently, the dimension or size of one piece of picture element) in the target image TI is described to be large, for the sake of explanation. In reality, the size of one piece of picture element line in the target image TI is much smaller.

As indicated in the table TB1, in each of the three target picture element columns C1, C2, and C3, the blank picture element flag F1 of a picture element indicating the background BG among the respective picture elements is set to be "1", and the blank picture element flag F1 of a picture element indicating the object Ob among the respective picture elements is set to be "0".

In step S235 of FIG. 6A, the processor 211 determines as to whether or not the processing for all the target picture elements are ended. In a case that there is any un-processed target picture element (S235: NO), the processor 212 proceeds the processing to step S215 and performs the processing of un-processed target picture elements. In a case that the processing for all the target picture elements are ended (S235: YES), the processor 211 proceeds the processing to step S240.

In the processings of steps S240 to S260, the processor 211 uses the color values of V pieces of picture elements, respectively, which are included in V pieces of target picture element columns among all the picture element rows (namely, the U pieces of picture element rows) of the target image TI, so as to identify a blank row. Specifically, in step S240, the processor 211 selects, among the U pieces of the picture element rows, a un-processed picture element row as a processing picture element row which is a picture element row to be used in a determining processing (to be described later on). In the following, the row number of the processing picture element row is "j". Further, a picture element row of which row number is "j" is described as a picture element row PR(j).

In step S245, the processor 211 refers to the data of the blank picture element flags F1 stored in the memory 215 so as to determine as to whether or not all the V pieces of picture elements of which row number is "j" are all the blank picture elements, among the picture elements in the V pieces of the target picture element columns. In a case that all the V pieces of the picture elements of which row number is "j" are all the blank picture elements (S245: YES), the processor 211 sets, in step S250, a first type-blank row flag (referred to as a "first type-blank row flag Fc(j)") of the processing picture element row PR(j) to be "1" representing the blank row, and proceeds the processing to step S260. In a case that at least one of the V pieces of the picture elements of which row number is "j" includes a picture element which is the non-blank picture element (S245: NO), the processor 211 sets, in step S255, the first type-blank row flag Fc(j)") of the processing picture element row PR(j) to be "0" representing a non-blank row, and proceeds the processing to step S260. Note that in step S250 and step S255, the processor 211 stores the data indicating the first type-blank row flag Fc(j) which has been set to the memory 215 (either one of the volatile memory 220 and the non-volatile memory 230).

The table TB1 at the right part of FIG. 9 indicates an example of the first type-blank row flag Fc(j). As depicted in FIG. 9, in a case that all the blank picture element flags F1 of 3 (three) pieces of the picture elements having the same row number "j" are "1 (blank picture element)", the first type-blank row flag Fc(j) is set to be "1 (blank row)". In a case that at least one of the blank picture element flags F1 of 3 (three) pieces of the picture elements having the same row number "j" are "0 (non-blank picture element)", the first type-blank row flag Fc(j) is set to be "0 (non-blank row)". In the following, a picture element row of which first type-blank row flag Fc is "1" is also referred to as a "first type-blank row".

In step S260, the processor 211 determines as to whether or not the processing for all the picture element rows are ended. In a case that there is any un-processed picture element row (S260: NO), the processor 212 proceeds the processing to step S240 and performs the processing of un-processed picture element row(s). In a case that the processing for all the picture element rows are ended (S260: YES), the processor 211 ends the processing of FIGS. 6A and 6B, namely, the processing of step S130 of FIG. 5.

In step S140 (FIG. 5), the processor 211 refers to the data of the first type-blank row flag Fc stored in the memory 215, and determines as to whether or not the first type-blank row is detected from the target image TI. In a case that the first type-blank row is not detected (S140: NO), the processor 211 proceeds the processing to step S190, and executes a normal print processing.

Figure 5:
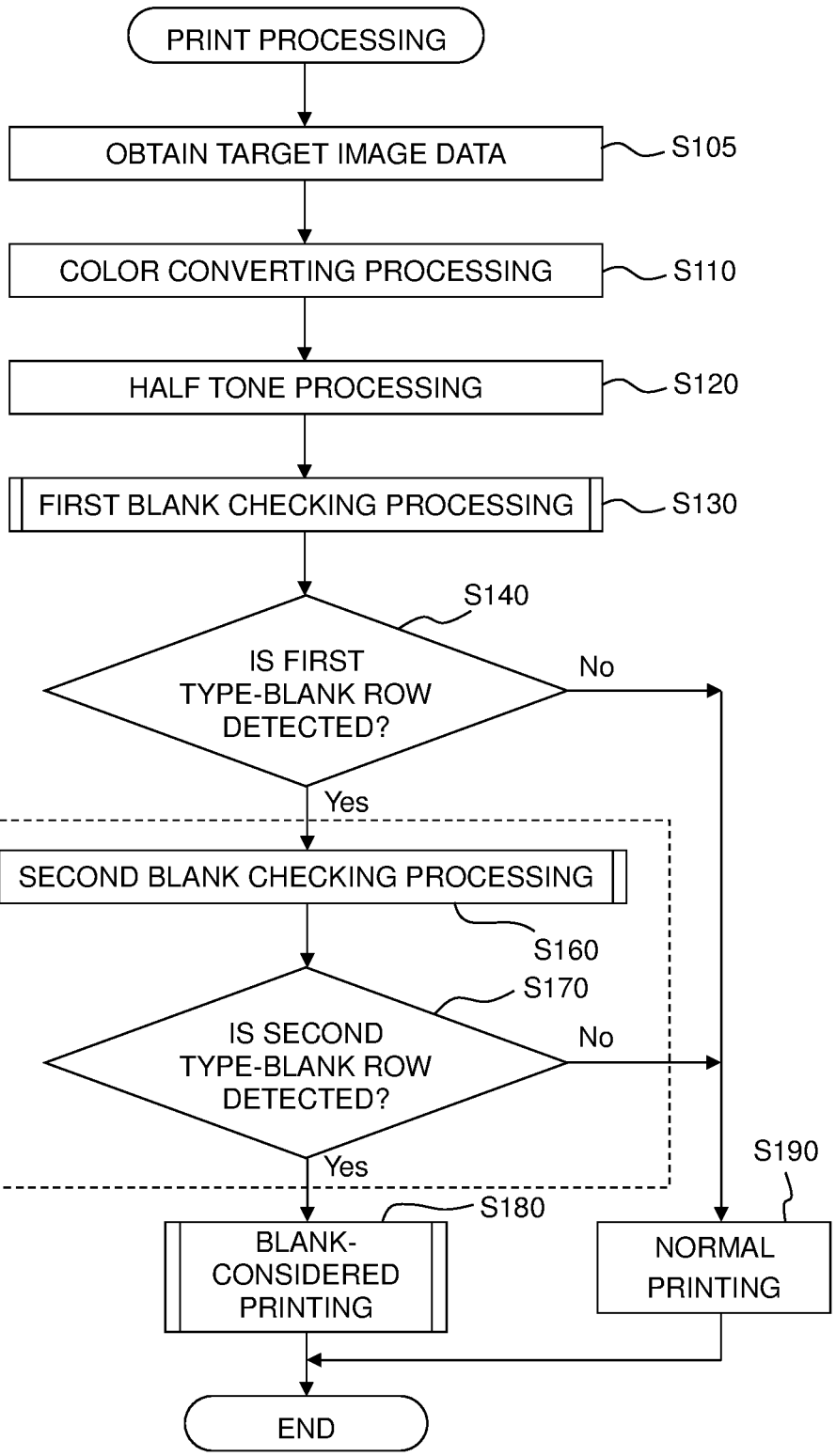
FIG. 5 is a flowchart depicting an example of a print processing.

In the normal print processing of the present embodiment, the processor 211 arranges the plurality of band areas on the target image TI, as explained with reference to FIG. 4. The plurality of band areas are arranged side by side from an end on the side of +Dy direction of the target image TI toward the −Dy direction. Two adjacent band areas which are adjacent to each other are overlapped in the overlap area having the width Wb. The processor 211 generates the print data so that each of the images of the plurality of band areas, respectively, which are arranged in the above-described manner is printed by one partial printing (one time of the partial printing). The partial print data, which is print data for one partial printing, includes information for identifying picture elements for each of which dot is to be formed, and information indicating the conveyance amount of the paper sheet PM after the partial printing. The processor 211 uses the above-described dot data so as to generate a plurality of pieces of partial print data for the partial printing to be performed a plurality of times. Further, the processor 211 outputs, one by one, the generated plurality of pieces of partial print data to the motor controller 214 in accordance of the order of printing sequence. The motor controller 214 controls a variety of kinds of motors (not depicted in the drawings) of the printer part 400 and controls the head driving part 420, in accordance with the partial print data. With this, the one time of partial printing and the conveyance of the paper sheet PM are performed. Then, the controller 214 causes the printer part 400 to execute the plurality of times of partial printing, in accordance with the plurality of pieces of the partial print data. In the above-described manner, the target image TI is printed. Then, the processing of step S190, and consequently the print processing of FIG. 5, are ended.

In a case that the first type-blank row is detected (S140: YES), the processor 211 executes, in step S160, a second blank checking processing of the target image. In the second blank checking processing, the color values of all the picture elements of the first type-blank row (namely, the T pieces of picture elements) are used so as to identify a blank row which does not include any non-blank picture elements (namely, a blank row of which picture elements are all the blank elements).

An explanation will be given about the second blank checking processing depicted in FIGS. 7A and 7B. In step S310, the processor 211 selects a un-processed picture element row, among all the image element rows included in the target image TI (namely, the U pieces of picture element rows), as a processing picture element row which is a picture element row to be used in a determining processing (to be described later on). In the following, the row number of the processing picture element row is "j".

In step S315, the processor 211 refers to the data of the first type-blank row flag Fc stored in the memory 215 so as to determine as to whether or not the processing element row PR(j) is the first type-blank row or not. In a case that the Fc(j)=0 (non-blank row), namely, in a case that the processing picture element row PR(j) is not the first type-blank row (S315: NO), the processor 211 sets, in step S345, a second type-blank row flag (referred to as "second type-blank flag Fr(j)") of the processing picture element row PR(j) to be "0" indicating the non-blank row, and the processor 211 stores the data indicating the second type-blank row flag Fr(j) in the memory 215 (either one of the volatile memory 220 and the non-volatile memory 230). Further, the processor 211 proceeds the processing to step S350.

Figure 10:
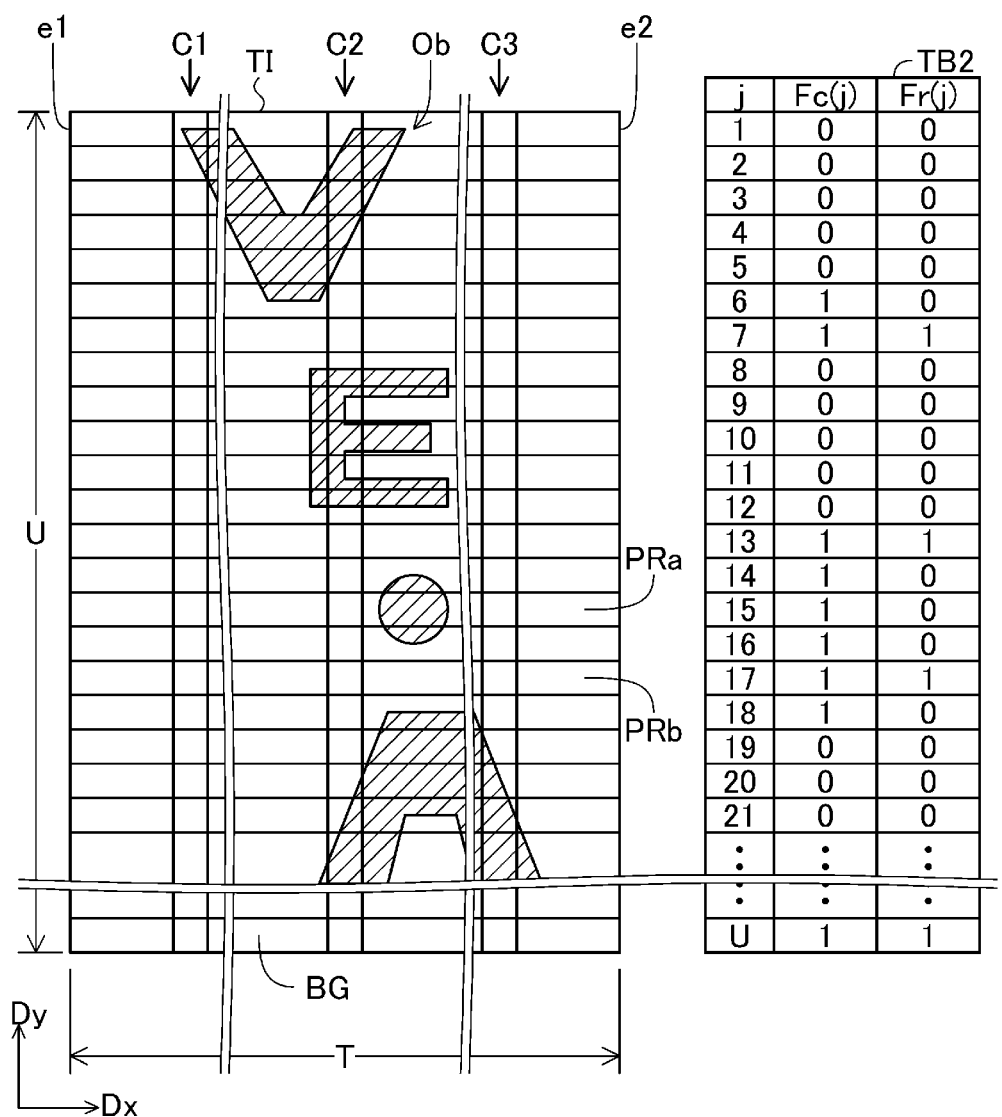
FIG. 10 is a schematic view depicting an example of the target image TI and a second type-blank row flag Fr.

A left part in FIG. 10 depicts a target image TI which is same as the target image TI depicted in FIG. 9. A right part of FIG. 10 depicts a table TB2 indicating an example of the second type-blank row flag FR. The table TB2 indicates the relationship among the row number j, the first type-blank row flag Fc(j) and the second type-blank row flag Fr(j). Similarly to the table TB1 in FIG. 9, the row number j and the descriptive positions in the longitudinal (lengthwise) direction of the first type-blank row flag Fc and the second type-blank row flag Fr correspond to the position in the longitudinal direction (namely, the position in the conveyance direction Dy) of a picture element row of the same row number j in the target image Ti in the left part of FIG. 10.

As depicted in FIG. 10, in a case that Fc(j)=0 (non-blank row) (FIG. 7A, S315: NO), Fr(j) is set to "0 (non-blank row)".

In a case that the processing picture element row PR(j) is the first type-blank row (FIG. 7A, S315: YES), the processor 211 obtains, in step S320, the color value data for all the picture elements in the processing picture element row PR(j) (namely, the T pieces of picture elements). In the present embodiment, the dot data is obtained from the memory 215 as the color value data.

In step S325, the processor 211 selects a un-processed picture element from the picture elements in the processing picture element row PR(j), as a processing picture element which is a picture element to be used in a determining processing (to be described later on). In the following, it is provided that the column number of the processing picture element is "i". Note that the row number is "j".

In step S330, the processor 211 determines as to whether or not the processing picture element P(i, j) is a blank picture element. The determining method in step S330 is same as the determining method in step S220 of FIG. 6A.

In a case that the processor 211 determines that the processing picture element P(i, j) is not a blank picture element (S330: NO), the processor 211 executes step S345, and proceeds the processing to step S350. In the example depicted in FIG. 10, in a case that j=15, Fc(15) is 1 (blank). However, this picture element row PRa indicates the object Ob, and thus the result of determination in step S330 may be "NO". As a result, in step 345, Fr(15) is set to be 0 (zero) (non-blank row).

In a case that the processor 211 determines that the processing picture element P(i, j) is a blank picture element (S330: YES), the processor 211 determines in step S335 as to whether or not the processing for all the picture elements in the processing picture element row PR(j) are ended. In a case that there remains any un-processed picture element (S335: NO), the processor 212 proceeds the processing to step S325 and performs the processing of un-processed picture elements. In a case that all the picture elements in the processing picture element row PR(j) are the blank picture elements (S330: YES), the processor 211 sets, in step S340, the second type-blank row flag Fr(j) of the processing picture element row PR(j) to be "1" indicating the blank row, and stores the data indicating the second type-blank row flag Fr(j) to the memory 215 (either one of the volatile memory 220 and the non-volatile memory 230). Then, the processor 211 proceeds the processing to step S350.

In a case that J=17 in the example of FIG. 10, Fc (17) is 1 (blank row). Further, this picture element row PRb does not indicate the object Ob. As a result, in step S340, Fr(17) is set to be 1 (blank row). In the following, a picture element row of which second type-blank row flag Fr is "1" is referred to as a "second type-blank row".

In step S350 (FIG. 7B), the processor 211 determines as to whether or not the processing for all the picture element rows is ended. In a case that there remains any un-processed picture element row (S350: NO), the processor 211 proceeds the processing to step S310 and executes the processing for the un-processed picture element row(s). In a case that the processing for all the picture element rows is ended (S350: YES), the processor 211 ends the processing in FIGS. 7A and 7B, namely, the processing of step S160 of FIG. 5.

In step S170 (FIG. 5), the processor 211 refers to the data of the second type-blank row flag Fr stored in the memory 215, and determines as to whether or not the second type-blank row is detected from the target image TI. In a case that the second type-blank row is not detected (S170: NO), the processor 211 proceeds the processing to step S190, and executes the normal print processing. Then, the processor 211 ends the processing of FIG. 5.

In a case that the second type-blank row is detected (S170: YES), the processor 211 proceeds the processing to step S180, and executes a blank considered-print processing.

An explanation will be given about the blank-considered print processing depicted in FIGS. 8A and 8B. In step S410, the processor 211 initialize (resets) a number Z (also referred to as a "band number Z" or a "pass number Z") of a band area which is the processing target to 1 (one). As explained regarding FIG. 4, the plurality of band areas which are arranged side by side in the −Dy direction are arranged on the target image TI. The pass number Z is designated sequentially from 1 (one) to be arranged in an ascending order toward the −Dy direction. The printing of the images of the band areas, respectively, is performed sequentially in an order of the pass number Z.

In step S415 (FIG. 8A), the processor 211 determines the position in the sub scanning direction of the first band area to be a position at an end part in the +Dy direction of the target image TI. As indicated in the example depicted in FIG. 4, the first band area BI1 is located at the end part in the +Dy direction of the target image TI.

In step S420, the processor 211 determines as to whether or not an adjacent picture element row, which is a picture element row adjacent to the upstream side of a Zth band, is a blank row. The blank row is a picture element row to (for) which the ink is not discharged. In the present embodiment, in a case that the second type-blank row flag Fr of the adjacent picture element row is "1 (blank element row)", the processor 211 determines that the adjacent picture element row is the blank row. The processor 211 refers to the data of the second type-blank row flag Fr stored in the memory 215 and to execute the determination in step S420.

In a case that the second type-blank row flag Fr of the adjacent picture element row is determined not to be the blank row (is determined to be the non-blank row) (S420: NO), the processor 211 determines, in step S430, the position in the sub scanning direction of a Z+1th band area to be at position at which the Z+1th band area overlaps with the upstream side of the Zth band area, and proceeds the processing to step S435.

Figure 11:
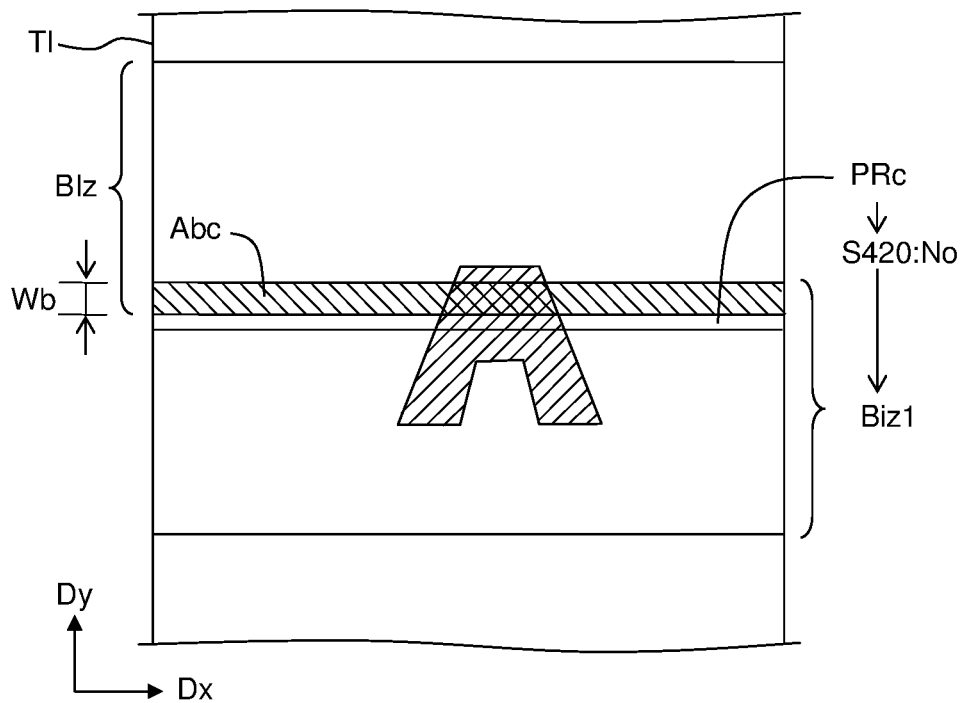
FIG. 11 is a schematic view depicting an example of arrangement of two band areas BIz and BIz1.

FIG. 11 is a schematic view depicting an example of arrangement of two band areas BIz and BIz1 which are adjacent to each other. FIG. 11 depicts a part or portion of the target image TI, and the band areas BIz and BIz1. The band area BIz is the Zth band area, and the band area BIz1 is the Z+1th band area. Here, a picture element row PRc which is adjacent to the upstream side (the −Dy side) of the Zth band area BIz is not the blank row (FIG. 8A, S420: NO). In this case, in step S430, the position of the Z+1th band area BIz1 is determined to be a position overlapping with a part or portion on the upstream side of the Zth band area BIz. An overlap area Abc indicated with a hatching is an area at which the two band areas BIz and BIz1 are overlapped with each other. The Width Wb in the sub scanning direction of the overlap area Abc is same as the width Wb as explained with reference to FIG. 4.

Figure 8A:
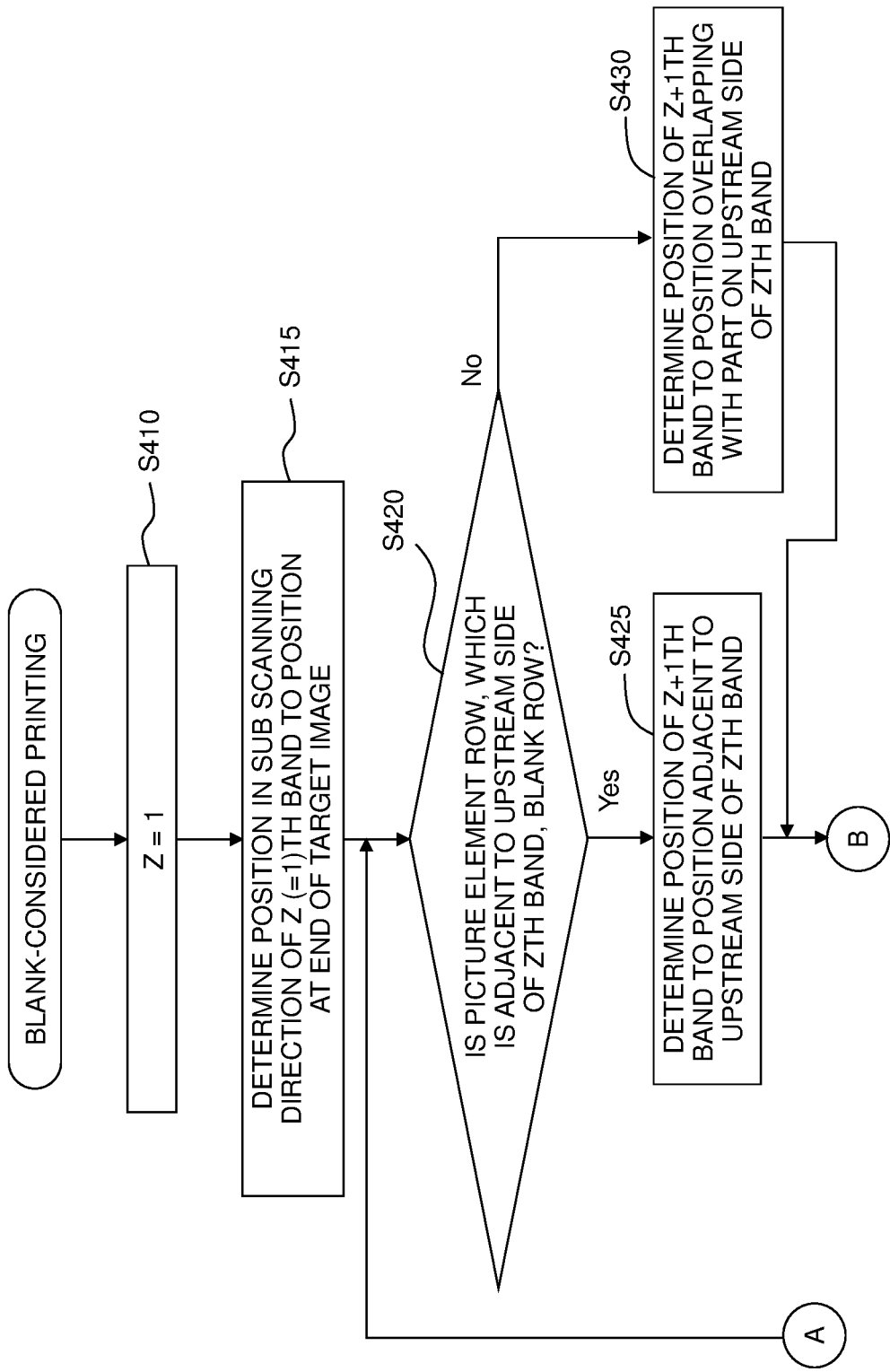
FIGS. 8A and 8B depict a flowchart depicting an example of a blank-considered print processing.

In a case that the adjacent picture element row is determined to be the blank row (FIG. 8A, S420: YES), the processor 211 determines, in step S425, the position in the sub scanning direction of the Z+1th band area to be a position which is adjacent to the upstream side of the Zth band area, without overlapping with the Zth band area BIz, and the processor 211 proceeds the processing to step S435.

Figure 12:
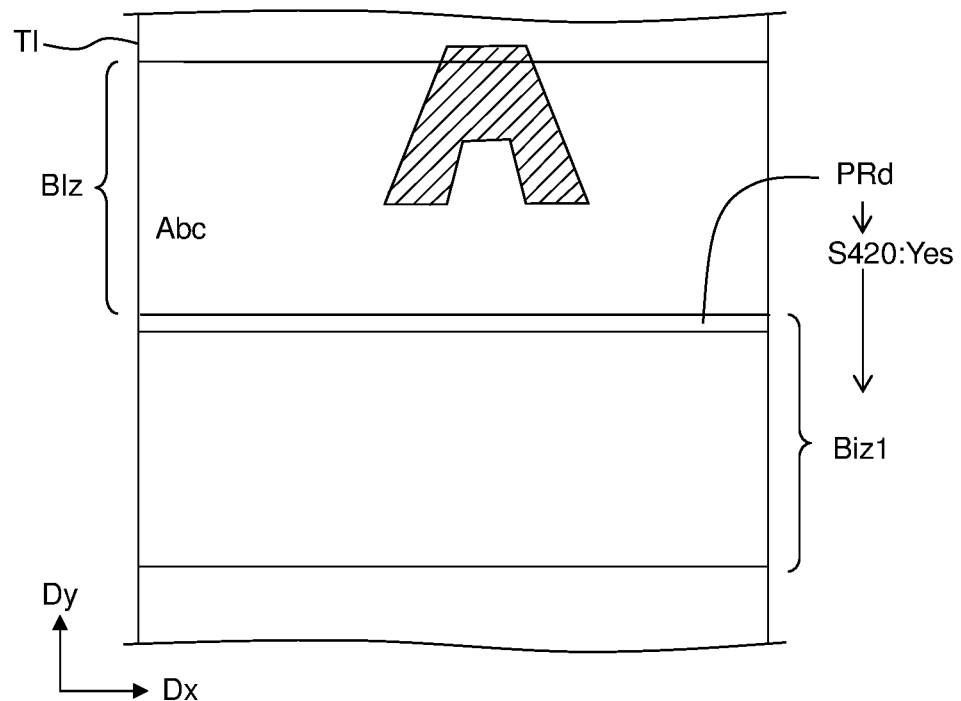
FIG. 12 is a schematic view depicting an example of the arrangement of the two band areas BIz and BIz1.

FIG. 12 is a schematic view depicting an example of the arrangement of two band areas BIz and BIz1 which are adjacent to each other. Similarly to FIG. 11, FIG. 12 depicts a part or portion of the target image TI, and the band areas BIz and BIz1. Here, a picture element row PRd which is adjacent to the upstream side (the −Dy side) of the Zth band area BIz is the blank row (FIG. 8A; S420: YES). In this case, in step S425, the position of the Z+1th band area BIz1 is determined to be a position adjacent to the upstream side (−Dy side) of the Zth band area BIz, without overlapping with the Zth band area BIz.

In step S435 (FIG. 8B), the processor 211 generates the partial print data for the Zth band area. As described above, the partial print data includes the information for identifying picture elements for each of which ink dot is to be formed, and the information indicating the conveyance amount of the paper sheet P after the partial printing.

In step S440, the processor 211 outputs the generated partial print data to the motor controller 214. The motor controller 214 controls a variety of kinds of motors (not depicted in the drawings) of the printer part 400 and controls the head driving part 420, in accordance with the partial print data. With this, a Zth partial printing is executed (the partial printing is performed for the Zth time), and the image of the Zth band area is printed.

In step S445, the processor 211 determines as to whether or not the processing for the entirety of the target image TI is ended. In a case that there is any un-processed part or portion remaining in the target image TI (S445: NO), the processor 211 adds, in step S450, 1 (one) to the number Z, and proceeds the processing to step S420. Then, the processor 211 performs the processing for a new band area. In a case that the processing for the entirety of the target image TI is ended (S445: YES), the processor 211 ends the processing of FIGS. 8A and 8B, namely, the processing of step S180 of FIG. 5. Then, the print processing of FIG. 5 is ended.

Note that the print processing of FIG. 5 is a print processing for a target image on one page of the paper sheet PM. In a case that the number of page of the paper sheet PM for which the printing is to be performed is not less than 2 (two), the processor 211 executes the processing of FIG. 5 for each of the pages.

As described above, in the present embodiment, the printer part 400 (FIGS. 1 and 2) is provided with the plurality of elements including the print head 410, the main scanning part 430 and the conveyor 440. The print head 410 (FIG. 3) has the nozzle groups NC, NM, NY and NK configured to discharge the CMYK inks, respectively. The main scanning part 430 (FIG. 2) executes the main scanning of moving the print head 410 relative to the paper sheet PM in the main scanning direction (specifically, the direction parallel to the Dx direction). The conveyor 440 executes the sub scanning of moving the paper sheet PM relative to the print head 410 in the sub scanning direction (also referred to as the "conveyance direction"; specifically, the Dy direction) crossing the main scanning direction (in the following the conveyor 44 is also referred to as a "sub scanning part 440"). Further, as explained with reference to FIG. 4, etc., the printer part 400 is controlled so that the printer part 400 prints an image by performing the partial printing and the sub scanning processing a plurality of times. The partial printing is the processing of causing the print head 410 to discharge the ink(s) while causing the main scanning part 430 to execute the main scanning. The sub scanning processing is the processing of causing the sub scanning part 440 to execute the sub scanning.

In step S210 (FIG. 6A), the processor 211 of the controller 299 obtains the color values of the picture elements in the V pieces of target picture element columns which are included in the target image TI as the target for which the printing is to be performed, and which extend in the sub scanning direction. In the present embodiment, the color values of the picture elements of the 3 (three) pieces of target picture element columns C1, C2 and C3 are obtained (V=3). Further, the dot data is obtained as the data indicating the color value. Namely, the value indicating the dot formation state is used as the color value.

In steps S215 to S235 (FIG. 6A), the processor 211 uses the color values of the picture elements of the V pieces of target picture element columns, respectively, to thereby identify the blank picture elements, for which the ink(s) is not discharged, among the picture elements of the V pieces of target picture element columns.

In step S245 (FIG. 6B), the processor 211 determine as to whether or not all the V pieces of picture elements of which row number is the same "j" are all the blank picture elements, among the picture elements in the V pieces of target picture element columns. In a case that all the V pieces of picture elements of which row number is the same "j" are all the blank picture elements, the processor 211 determines that the jth picture element row PR(j) is the first type-blank element row (S245: YES; S250). In such a manner, the processor 211 determines as to whether or not a candidate picture element row which includes V pieces of target picture element columns and located at a same position in the sub scanning direction (namely, having a same row number), is the first type blank row. The condition for determining that the candidate picture element row is the first type-blank row is that all the V pieces of the target picture elements included in all the picture elements (namely, the T pieces of picture elements) in the candidate picture element row are the blank picture elements.

Figure 8B:
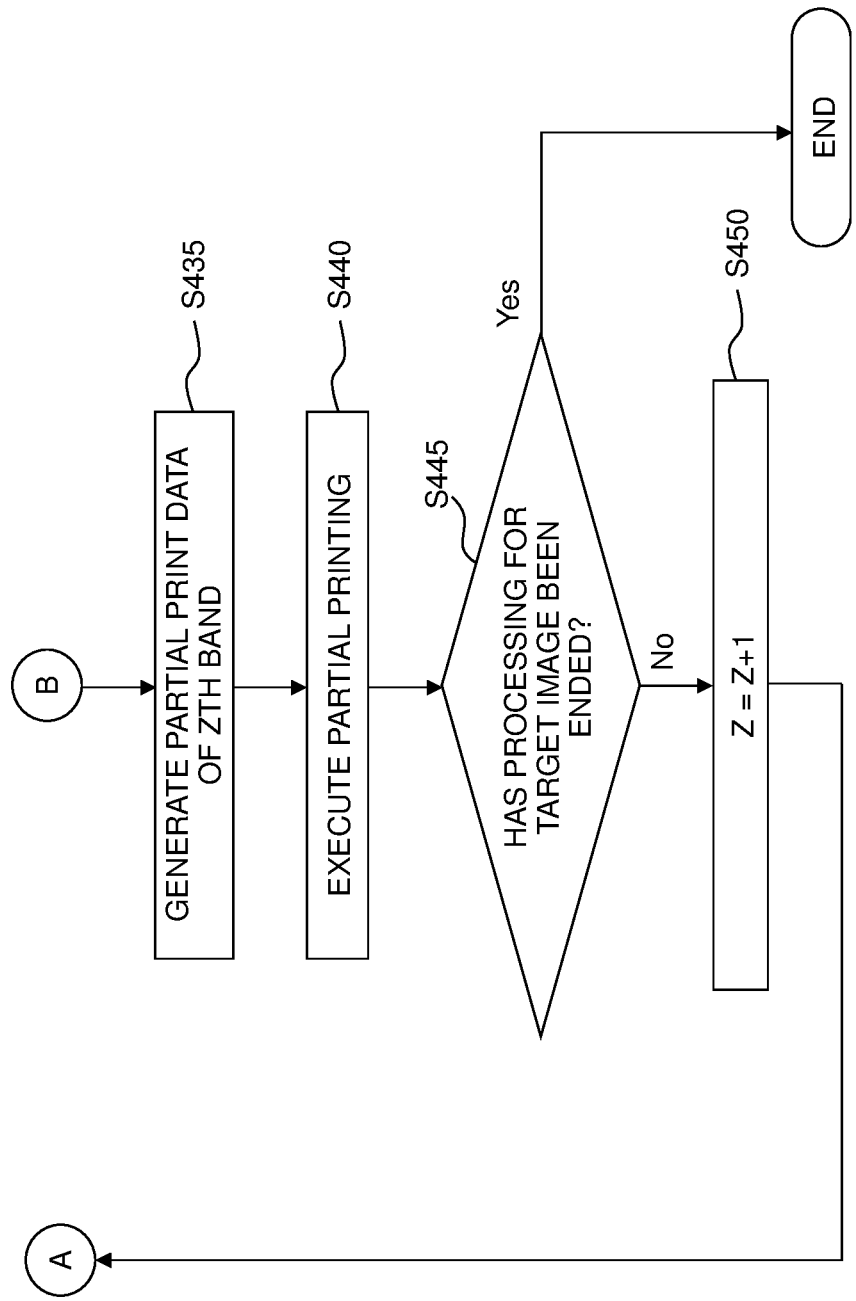

Further, as explained regarding steps S140 to S170 of FIG. 5, step S315 of FIG. 7A, FIGS. 8A and 8B, etc., in a case that the condition including that the picture element row is the first type-blank row is satisfied (in the present embodiment, FIG. 6B, S245: YES; FIG. 7A, S315: YES, S330: Yes, S335: Yes; FIG. 8A, S420: YES), the picture element row is identified as the blank row for which ink(s) is not discharged.

As described above, since the processor 211 identifies the blank row by using the picture elements which are a part of the plurality of picture elements of the target image TI, thereby making it possible to shorten the time required for identifying the blank row, as compared with a case of identifying the blank row by using all the picture elements of the target image TI.

Further, in step S315 (FIG. 7A), the processor 211 determines as to whether or not the jth picture element row PR(j) is the first type-blank row. In the present embodiment, in a case that all the V pieces of picture elements of the picture element row PR(j) (namely, the V pieces of picture elements included in the V pieces of target picture element columns) are the blank picture elements, the picture element row PR(j) is determined to be the first type-blank element row. In a case that all the V pieces of the picture elements of the picture element row PR(j) are the blank elements (S315: YES), the processor 211 obtains, in step S320, the color values of all the picture elements (namely, the T pieces of picture elements) in the picture element row PR(j). In steps S325 to S335, the processor 211 uses the color values of the T pieces of picture elements, respectively, of the picture element row PR(j) to thereby identify the blank element from the T pieces of picture elements. In a case that all the T pieces of the picture elements are the blank elements, namely in a case that al the picture elements of the picture element row PR(j) are the blank elements, the processor 211 determines that the picture element row PR(j) is the second type-blank row (S340). As explained regarding step S420 of FIG. 8A, the condition that a picture element row is determined to be the blank row includes that the picture element row is the second type-blank row. Namely, the condition that a picture element row is determined to be the blank row includes that all the picture elements in the picture element row (namely, the T pieces of picture elements) are the blank picture elements (S330: YES, S335: YES, S340). Accordingly, it is possible to suppress the occurrence of such a situation that a picture element row including a non-blank picture element is determined as the blank row. For example, it is possible to suppress the occurrence of such a situation that a picture element row, such as the 15th picture element row PR in FIG. 10, indicating an object not overlapping with the V pieces of target picture element columns C1, C2 and C3 is determined as the blank row.

Further, a first area A1 and a second area A2 are indicated in the target image TI of FIG. 9. The first area A1 is an area including an end e1 on one side in the main scanning direction of the target image TI. In the present embodiment, the first area A1 is a rectangular area extending in the sub scanning direction and having a first width W1 (W1>0) in the main scanning direction which is determined in advance. The second area A2 is an area including an end e2 on the other side in the main scanning direction of the target image TI. In the present embodiment, the second area A2 is a rectangular area extending in the sub scanning direction and having a second width W2 (W2>0) in the main scanning direction which is determined in advance. The target picture element columns C1, C2 and C3 are picture elements columns in an inner area, among the target image TI, which is a reminder area obtained by excluding the first area A1 and the second area A2 from the target image TI. Namely, the target picture element columns C1, C2 and C3 are picture element columns which are located at positions, respectively, which are separated from the ends e1 and e2 toward the inner side of the target image TI. Normally, an object of the target image is arranged in an inner area separated from the ends e1 and e2 of the target image. Accordingly, the target picture element columns C1, C2 and C3 may indicate an object of the target image (for example, the object Ob). By using such target picture element columns C1, C2 and C3, it is possible to identify the blank row(s) appropriately. Note that the second width W2 may be same as the first width W1, or may be different from the first width W1.

Furthermore, as explained with reference to FIG. 4, FIG. 5, FIGS. 8A and 8B, etc., the entirety of the processor 211 and the motor controller 214 is an example of the print processing part which executes the partial printing and the sub scanning a plurality of times to thereby causes the printer part 400 to print the target image. Moreover, in step S420 of FIG. 8A, the processor 211 determines as to whether or not an adjacent picture element row, adjacent to the upstream side in the sub scanning direction Dy of the band area BIz which is a band area as the print target of the Zth partial printing (Z is an integer not less than 1) and extending in the main scanning direction on the target image TI, is the blank row. In a case that the adjacent picture element row is determined to be the blank row (S420: YES), the processor 211 determines, in step S425, the position in the sub scanning direction of the band area BIz1 for the Z+1th partial printing to be a position not overlapping with the Zth band area BIz for the Zth partial printing, as explained above with reference to FIG. 12. Further, the processor 211 and the motor controller 214 cause the printer part 400 to print the image of the band area BIz1 by the Z+1th partial printing (S435, S440). Since the overlapping area is omitted in such a manner, the printing velocity for printing the target image TI can be improved. For example, by omitting a plurality of overlapping areas, the number of times of the partial printing which are to be executed for printing the target image TI may be lowered.

On the other hand, in a case that the adjacent picture element row is determined not to be the blank row (S420: NO), the processor 211 determines, in step S430, the position in the sub scanning direction of the band area BIz1 for the Z+1th partial printing to be a position overlapping with a part or portion on the upstream side of the Zth band area BIz for the Zth partial printing. Further, the processor 211 and the motor controller 214 cause the printer part 400 to print the image of the band area BIz1 by the Z+1th partial printing (S435, S440). Accordingly, it is possible to suppress the occurrence of such a situation that the boundary line of the two band areas becomes conspicuous on the printed target image TI.

Further, as explained regarding step S425 of FIG. 8A and FIG. 12, in a case that the adjacent picture element row is determined to be the blank row (S420: YES), the processor 211 determines, in step S425, the position of the band area BIz1 for the Z+1th partial printing to be a position adjacent to the upstream side of the band area BIz for the Zth partial printing. In such a manner, the adjacent picture element row Rb which is determined to be the blank row is included in the band area BIz1 for the Z+1th partial printing. Accordingly, even in a case that a non-blank picture element is included in the adjacent picture element row Rb which has been determined to be the blank row, it is possible to print the non-blank picture element of the adjacent picture element row Rb.

Note that the total number V of the target picture element columns may be any integer in a range of not less than 1 to less than the picture element number T in the main scanning direction of the target image TI (FIGS. 4 and 9). As the total number V is greater, it is possible to reduce such a possibility that the first type blank row includes the non-blank picture element. On the other hand, as the total number V is smaller, it is possible to improve the speed for identifying the first type blank row.

Further, steps S160 and S170 in FIG. 5 may be omitted. In a case that the result of determination in step S140 is YES, then the processing may proceed to step S180. Then, in step S420 of FIG. 8A, in a case that the adjacent picture element row is the first type blank row, it is allowable to determine that the adjacent picture element row is the blank row. Also in such a case, the adjacent picture element row Rb which is determined as being the blank row is included in the band area BIz1, as explained regarding step S425 of FIG. 8A and FIG. 12. Accordingly, even in a case that the adjacent picture element row Rb which is determined to be the blank row includes the non-blank picture element, it is possible to print the non-blank picture element. Note that as the total number V of the target picture element columns is greater, it is possible to reduce such a possibility that the first type blank row includes the non-blank picture element. Accordingly, in a case that steps S160 and S170 of FIG. 5 are omitted, it is preferred that the total number V of the target picture element columns is not less than 2.

<Modifications>

The color values utilized for identifying the blank picture element (FIG. 6A: S210, FIG. 7A: S320) may be a variety of kinds of color values, rather than the values indicating the dot formation state. In a case that the half tone processing (FIG. 5: S210) is a processing using the diether matrix, the results of half tone processing between a plurality of picture elements do not affect each other. Accordingly, the processor 211 is capable of identifying the blank color element by using color values of an arbitrary color space. For example, in a case that the color value of a picture element indicates the white color which is the brightest in a possible range of the color values, it is allowable to identify the picture element as the blank color element. The color values may be color values in the ink color space (for example, the color values of CMYK), or color values of another color space (for example, color values of RGB). In such a manner, the processor 211 may obtain the color values of certain picture elements by using a part or portion which is included in an image data which is different from the dot data indicating the dot formation state for the printing (for example, the bit map data of CMYK, the bit map data of RGB, etc.), and which correspond to the certain picture elements. In a case that the half tone processing is a processing in which an error propagates (dissipates) between a plurality of color elements as in the error diffusion processing, there is such a possibility that a dot might be formed, due to the error, in a picture element indicating the brightest color which is the white color. Here, the half tone processing may be performed in according with a rule of "calculating an error without forming any dot in a picture element indicating the white color as the brightest color". In such a case, the processor 211 may identify a blank color element by using color values of an arbitrary color space.

Note that in a case of using the color values of the ink color space (for example, the color values of CMYK) so as to identify the blank picture element, the processor 211 may use the image data for which the color conversion processing has been performed so as to proceed the obtainment of the color values of the color elements, the identification of the blank row, and the determination of arrangement of a plurality of band areas, before the processor 211 completes the half tone processing for the entirety of the target image. Further, in such a case of using color values before the color conversion procession (for example, the color values of RGB), the processor 211 may use the image data before the color conversion processing so as to proceed the obtainment of the color values of the color elements, the identification of the blank row, and the determination of arrangement of a plurality of band areas, before the processor 211 completes the color conversion processing for the entirety of the target image.

The print processing may be a variety of kinds of processings, rather than the processings depicted in FIGS. 5 to 8. For example, the half tone circuit 213 (FIG. 1) may proceed the half tone processing for a part or portion, of the target image, for which the color conversion processing performed by the color conversion circuit 212 has been already completed, before the color conversion processing is completed for the entirety of the target image. Further, one or more pieces of target picture element column(s), among the V pieces of target picture element columns, may contact an end part in the main scanning direction of the target image (for example, the end e1 or the end e2 of the target image TI in FIG. 9). In a case that the V pieces of target picture element columns include a picture element column contacting the end in the main scanning direction of the target image, the processor 211 is capable of appropriately identifying the blank row from the target image indicating an object contacting the end.

Further, the method of arranging the band areas in a case that the blank row is identified may be an arbitrary method, rather than the method explained with reference to FIGS. 8A and 8B. The arrangement of the band areas may be determined so as to skip the blank row. For example, in a case that E pieces of the blank row (E is an integer not less than 1 are continued on the upstream side of the Zth band area, the position in the sub scanning direction of the Z+1th band area may be determined to be a position at which the Z+1th band area is adjacent to the upstream side of the E pieces of the blank row, rather than overlapping with the E pieces of the blank row. Furthermore, the processor 211 may use the result of analysis of the target image to thereby determine the printing direction of each of the band areas. Moreover, it is allowable to alternately execute the partial printing in the +Dx direction and the partial printing in the −Dx direction. Further, the processor 211 may adjust the width in the sub scanning direction of the band area by using the result of analysis of the target image. Furthermore, the processing using an identified blank row may be any arbitrary processing, rather than the processing of arranging the band areas for the printing. For example, the processor 211 may execute a processing of displaying on a display (for example, the display 240 (FIG. 1)) information indicating the position of the blank row.

The configuration of the printer part 400 may be a variety of kinds of configurations different from the configuration of the embodiment as depicted in FIGS. 1 to 3. For example, a number L of kinds of usable inks (L kinds of usable inks) may be any number which is not less than 1. Further, the print head 410 may have L pieces of the nozzle group configured to discharge the L kinds of inks and arranged side by side in the main scanning direction. A plurality of nozzles constructing one piece of the nozzle group (namely, a plurality of nozzles configured to discharge a same ink) are preferably arranged at positions in the sub scanning direction which are mutually different. In the embodiment depicted in FIG. 3, the positions in the main scanning direction are same among the plurality of nozzles NZ in one piece of the nozzle group. Instead of the above-described configuration, it is allowable that the plurality of nozzles NZ in one piece of the nozzle groups includes nozzles NZ of which position in the main scanning direction are mutually different. Further, the cartridge installing part 451 may be fixed to the carriage 433. The platen PT may be omitted. It is allowable that two pieces of rollers configured to sandwich the paper sheet PM therebetween are used as upstream rollers. Further, it is allowable that two pieces of rollers configured to sandwich the paper sheet PM therebetween are used as downstream rollers. The sub scanning part 440 may have any configuration so as to convey the paper sheet PM along the sub scanning direction. For example, the sub scanning part 440 may be provided with a roller which conveys the print medium on either one of the upstream side and the downstream side of the print head. The main scanning part 430 may have any configuration so as to move the print head in the main scanning direction relative to the print medium.

Further, the printer part 400 may be a so-called line printer. For example, it is allowable that the printer part is not provided with the main scanning part 430; instead, it is allowable that the printer part is provided with one or more pieces of nozzle group constructed of a plurality of nozzles which are arranged side by side in a direction orthogonal to the conveyance direction. The plurality of nozzles in each of the nozzle group(s) are arranged side by side over a length which is substantially same as the width of the paper sheet PM. The line printer executes the printing without performing the main scanning. For example, the line printer may perform printing of an image by executing, a plurality of times, a processing of forming dots by the print head and the conveyance of the paper sheet PM with the conveyor. The print head of the line printer is an example of an image forming part which forms an image on a print medium by using a coloring material. Here, the controller may control the printer part so as to skip the blank row. For example, in a case that a part or portion, of the paper sheet PM, which corresponds to the blank row faces or is opposite to the nozzles, the controller may control the printer part so as to convey the paper sheet PM at a velocity faster than that in another case that another part or portion, of the paper sheet PM, which corresponds to the non-blank row faces or is opposite to the nozzles.

Furthermore, the printer part 400 may be a so-called laser printer. For example, the printer part may include a toner image forming device, and a conveying roller. The toner image forming device is an example of an printer part configured to form the image on a print medium by using a coloring material (which is, for example, a toner in this modification). The toner image forming device may include, for example, a photosensitive drum, and a fixing device. The conveying roller moves the paper sheet PM along a route which passes the toner image forming device. With this, the paper sheet PM moves in a direction along the route with respect to the toner image forming device. A toner image formed by the photosensitive drum is transferred onto the paper sheet PM. The fixing device applies the heat and pressure to the paper sheet PM to thereby fix the toner image on the paper sheet PM. Here, the controller may control the printer part so as to skip the fixing of a target blank area which is an area wherein predetermined H pieces (H is an integer not less than 1) of the blank row are continued. For example, in a case that a part or portion, of the paper sheet PM, which corresponds to the target blank area makes contact with the fixing device, the controller may control the printer part so as to stop the heating performed by the fixing device.

In the above-described embodiment, the multi-function peripheral 200 is an example of a printing apparatus provided with the printer part 400. The scanner part 280 may be omitted. The controller 299 is an example of a controller of a printing apparatus provided with the printer part 400. Further, the controller 299 is an example of a controller configured to control the printer part 400. At least one of the display 240 and the operating part 250 may be omitted.

Furthermore, the processing of generating the print data by using the target image data (FIG. 5) may be executed by an external device or apparatus (for example, a personal computer) connected to the multi-function peripheral 200, rather than by the controller 299 of the multi-function peripheral 200. For example, the communication interface 270 may include a network interface such as a wired LAN interface, a wireless interface based on IEEE 802.11, etc. Moreover, a controller of the external apparatus which is communicable via the network interface may generate the print data. The controller of the external apparatus determines the arrangement of a plurality of band areas on a target image in accordance with, for example, the procedure in FIG. 5, and generates a plurality of pieces of the partial print data for the partial printings of the band areas, respectively. Further, the controller of the external apparatus outputs the generated plurality of pieces of the partial print data to the multi-function peripheral 200. The controller 299 of the multi-function peripheral 200 causes the printer part 400 to execute the partial printings in accordance with the received plurality of pieces of the partial print data. In this case, the multi-function peripheral 200 is an example of the printer part, and the controller of the external apparatus is an example of the controller which controls the multi-function peripheral 200 (and consequently, the printer part).

Furthermore, the controller of the external apparatus may generates print data which is same as the print data generated in the normal print processing in step S190 of FIG. 5, without identifying the blank row in the target image, and may output the generated print data to the multi-function peripheral 200. The controller 299 of the multi-function peripheral 200 may use the received print data as the target image data, and may execute the processings of steps S130 to S190 in FIG. 5.

Moreover, the controller of the external apparatus may supply a print instruction and image data for printing to the multi-function peripheral 200. The multi-function peripheral 200 may use the received image data to execute the processing of FIG. 5. Here, the processor 211 may obtain the data of the V pieces of target picture element columns from the external apparatus, before the receipt of the image data as a whole from the external apparatus is completed. Further, the processor 211 may proceed the processing of identifying the blank row, before the processor 211 completes the obtainment of the entirety of the image data.

In each of the embodiment and modifications, a part or portion of the configuration realized by the hardware may be replaced by a software, and conversely, a part or the entirety of the configuration realized by the software may be replaced by the hardware. For example, the processing of step S130 in FIG. 5 may be realized by a dedicated hardware circuit.

In a case that a part or the entirety of the functions of the present disclosure can be realized by a computer program, such a computer program can be provided in an aspect of being stored in a computer-readable and non-transitory recording medium. The program may be used in a state that the program is stored in a same or different recording medium (non-transitory computer-readable recording medium) from the time at which the program is provided. The term "non-transitory computer-readable recording medium" is not limited to or restricted by a recording medium of the mobile type such as a memory card, CD-ROM, etc., but may also include an internal memory inside a computer such as a variety of kinds of ROM, etc., an external memory, such as a hard disc drive, etc., which is connected (connectable) to the computer, and the like.

The present disclosure has been explained based on the embodiment and modifications in the foregoing. The embodiment of the present disclosure which has been explained as above, however, is provided for such a purpose that the present disclosure is easily understood, and is not intended to limit or restrict the present disclosure in any way. The present disclosure may be changed, modified, or improved within a range not departing from the gist and/or sprit of the present disclosure, and may encompass any equivalent of the present disclosure.

What is claimed is:

1. A controller configured to cause a printing apparatus to perform printing of an image, the printing apparatus including a printer part configured to form the image on a medium by using a coloring material, and a conveyor configured to convey the medium in a first direction relative to the printer part,
the controller being configured to execute:
obtaining color values of a plurality of picture elements, respectively, of P pieces of target picture element columns which are included in a target image to be printed and which extend in the first direction;
identifying a blank picture element, which is a picture element indicating a white color as a brightest color, among the plurality of picture elements of the P pieces of the target picture element columns by using the color values of the plurality of picture elements, respectively, of the P pieces of the target picture element columns; and
identifying a candidate picture element line as a blank line which is a picture element line indicating the white color as the brightest color among the plurality of picture elements, in a case that the candidate picture element line satisfies a first blank line condition that all the P pieces of target picture elements included in the candidate picture element line are each the blank picture element, the candidate picture element line being a picture element line which includes T pieces of picture elements arranged side by side in a second direction orthogonal to the first direction and which includes the P pieces of the target picture elements each selected from one of the P pieces of the target picture element columns and located at a same position in the first direction,
wherein P is an integer in a range of not less than 2 to less than T.

2. The controller according to claim 1, further configured to execute:
obtaining color values of the T pieces of the picture elements, respectively, of the candidate picture element line including the P pieces of the target picture elements all of which are each the blank picture element; and
identifying the blank picture element among the T pieces of the picture elements of the candidate picture element line by using the color values of the T pieces of the picture elements, respectively, of the candidate picture element line,
wherein the first blank line condition includes a condition that all the T pieces of the picture elements in the candidate picture element line are each the blank picture element.

3. The controller according to claim 1, wherein a target picture element column of the target picture element columns is a picture element column in an inside area, in the target image, which is a remainder area obtained by excluding, from the target image, a first area including one end of the target image on a side in the second direction and a second area including the other end in the second direction and located on a side opposite to the one end, and the inside area being located on an inside with respect to the first and second areas in the second direction.

4. The controller according to claim 1, wherein the color values of the plurality of picture elements are obtained by using a part of image data of which format is different from dot data indicating a dot formation state for printing, the part of image data relating to picture elements corresponding to the plurality of picture elements.

5. The controller according to claim 1, wherein the printer part of the printing apparatus includes:
a print head having a plurality of nozzles; and
a main scanning part configured to execute main scanning of moving the print head in the second direction relative to the medium,
wherein the conveyor is configured to convey the medium in the first direction relative to the print head.

6. The controller according to claim 5, further configured to execute:
causing the printing apparatus to print the target image by performing, a plurality of times, a partial printing of causing the print head to discharge ink while causing the main scanning part to perform the main scanning, and a conveying processing of causing the conveyor to convey the medium,
in a case that an adjacent picture element line is identified as the blank line, the adjacent picture element line being adjacent to an upstream side in the first direction of a first band area which is a band area extending in the second direction on the target image and which is a print target of the partial printing executed as a Zth partial printing, Z being an integer not less than 1, causing the printing apparatus to print another band area by the partial printing executed as a Z+1th partial printing such that the another band area does not overlap with the first band area; and
in a case that the adjacent picture element line is not identified as the blank line, causing the printing apparatus to print the another band area by the partial printing which is executed as the Z+1th partial printing such that the another band area printed by the Z+1th partial printing overlaps with a part on the upstream side in the first direction of the first band area.

7. The controller according to claim 6, further configured to cause the printing apparatus to print the another band area by the partial printing which is executed as the Z+1th partial printing so that the another band area printed by the Z+1th partial printing is adjacent to the upstream side in the first direction of the first band area, in the case that the adjacent picture element line is identified as the blank line.

8. A printer comprising:
the controller as defined in claim 1; and
the printing apparatus.

9. A controller configured to cause a printing apparatus to perform printing of an image, the printing apparatus including a printer part configured to form the image on a medium by using a coloring material, and a conveyor configured to execute conveyance of moving the medium in a first direction relative to the printer part,
the controller being configured to execute:
obtaining color values of a plurality of picture elements, respectively, of Q pieces of target picture element columns which are included in a target image to be printed and which extend in the first direction;

identifying a blank picture element, which is a picture element indicating a white color as a brightest color, among the plurality of picture elements of the Q pieces of the target picture element columns, by using the color values of the plurality of picture elements, respectively, of the Q pieces of the target picture element columns;

obtaining color values of T pieces of picture elements, respectively, of a candidate picture element line, the candidate picture element line being a picture element line which includes the T pieces of the picture elements arranged side by side in a second direction orthogonal to the first direction and which includes the Q pieces of target picture elements each selected from one of the Q pieces of the target picture element columns, all of the Q pieces of the target picture elements are each the blank picture element;

identifying the blank picture element among the T pieces of the picture elements of the candidate picture element line, by using the color values of the T pieces of the picture elements, respectively, of the candidate picture element line; and identifying the candidate picture element line as a blank line which is a picture element line indicating the white color as the brightest color among the plurality of picture elements, in a case that the candidate picture element line satisfies a second blank line condition that all the T pieces of the picture elements of the candidate picture element line are each the blank picture element, wherein Q is an integer in a range of not less than 1 to less than T.

10. The controller according to claim 9, wherein a target picture element column of the target picture element columns is a picture element column in an inside area, in the target image, which is a remainder area obtained by excluding, from the target image, a first area including one end of the target image on a side in the second direction and a second area including the other end in the second direction and located on a side opposite to the one end, and which is located on an inside with respect to the first and second areas in the second direction.

11. The controller according to claim 9, wherein the color values of the plurality of picture elements are obtained by using a part of image data of which format is different from dot data indicating a dot formation state for printing, the part of image data relating to picture elements corresponding to the plurality of picture elements.

12. The controller according to claim 9, wherein the printer part of the printing apparatus includes:
 a print head having a plurality of nozzles; and
 a main scanning part configured to execute main scanning of moving the print head in the second direction relative to the medium,
 wherein the conveyor is configured to convey the medium in the first direction relative to the print head.

13. The controller according to claim 12, further configured to execute:
 causing the printing apparatus to print the target image by performing, a plurality of times, a partial printing of causing the print head to discharge ink while causing the main scanning part to perform the main scanning, and a conveying processing of causing the conveyor to convey the medium,
 in a case that an adjacent picture element line is identified as the blank line, the adjacent picture element line being adjacent to an upstream side in the first direction of a first band area which is a band area extending in the second direction on the target image and which is a print target of the partial printing executed as a Zth partial printing, Z being an integer not less than 1, causing the printing apparatus to print another band area by the partial printing executed as a Z+1th partial printing such that the another band area does not overlap with the first band area; and
 in a case that the adjacent picture element line is not identified as the blank line, causing the printing apparatus to print the another band area by the partial printing which is executed as the Z+1th partial printing such that the another band area printed by the Z+1th partial printing overlaps with a part on the upstream side in the first direction of the first band area.

14. The controller according to claim 13, further configured to cause the printing apparatus to print the another band area by the partial printing which is executed as the Z+1th partial printing so that the another band area printed by the Z+1th partial printing is adjacent to the upstream side in the first direction of the first band area, in the case that the adjacent picture element line is identified as the blank line.

15. A printer comprising:
 the controller as defined in claim 9; and
 the printing apparatus.

16. A non-transitory computer-readable medium storing a computer program therein, the program being a program for a computer causing a printing apparatus to perform printing of an image, the printing apparatus including a printer part configured to form the image on a medium by using a coloring material, and a conveyor configured to execute conveyance of moving the medium in a first direction relative to the printer part,
the program causing the computer to execute:
 obtaining color values of a plurality of picture elements, respectively, of P pieces of target picture element columns which are included in a target image to be printed and which extend in the first direction;
 identifying a blank picture element, which is a picture element indicating a white color as a brightest color, among the plurality of picture elements of the P pieces of the target picture element columns, by using the color values of the plurality of picture elements, respectively, of the P pieces of the target picture element columns; and
 identifying a candidate picture element line as a blank line which is a picture element line indicating the white color as the brightest color among the plurality of picture elements, in a case that the candidate picture element line satisfies a first blank line condition that all the P pieces of target picture elements included in the candidate picture element line are each the blank picture element, the candidate picture element line being a picture element line which includes T pieces of picture elements arranged side by side in a second direction orthogonal to the first direction and which includes the P pieces of the target picture elements each selected from one of the P pieces of the target picture element columns and located at a same position in the first direction,
wherein P is an integer in a range of not less than 2 to less than T.

17. A non-transitory computer-readable medium storing a computer program therein, the program being a program for a computer causing a printing apparatus to perform printing of an image, the printing apparatus including a printer part configured to form the image on a medium by using a coloring material, and a conveyor configured to execute conveyance of moving the medium in a first direction relative to the printer part, the program causing the computer to execute:

obtaining color values of a plurality of picture elements, respectively, of Q pieces of target picture element columns which are included in a target image to be printed and which extend in the first direction;

identifying a blank picture element, which is a picture element indicating a white color as a brightest color, among the plurality of picture elements of the Q pieces of the target picture element columns, by using the color values of the plurality of picture elements, respectively, of the Q pieces of the target picture element columns;

obtaining color values of T pieces of picture elements, respectively, of a candidate picture element line, the candidate picture element line being a picture element line which extends in a second direction orthogonal to the first direction and which includes the Q pieces of target picture elements each selected from one of the Q pieces of the target picture element columns, all of the Q pieces of the target picture elements are each the blank picture element;

identifying the blank picture element among the T pieces of the picture elements of the candidate picture element line, by using the color values of the T pieces of the picture elements, respectively, of the candidate picture element line; and identifying the candidate picture element line as a blank line which is a picture element line indicating the white color as the brightest color among the plurality of picture elements, in a case that the candidate picture element line satisfies a second blank line condition that all the T pieces of the picture elements of the candidate picture element line are each the blank picture element, wherein Q is an integer in a range of not less than 1 to less than T.

\* \* \* \* \*